US012672011B2

(12) United States Patent
Rank

(10) Patent No.: US 12,672,011 B2
(45) Date of Patent: Jun. 30, 2026

(54) CAPACITY DASHBOARD FOR NETWORK MANAGEMENT SYSTEMS

(71) Applicant: T-MOBILE INNOVATIONS LLC, Overland Park, KS (US)

(72) Inventor: Sean J. Rank, Spring Hill, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 545 days.

(21) Appl. No.: 18/316,837

(22) Filed: May 12, 2023

(65) Prior Publication Data

US 2024/0381122 A1 Nov. 14, 2024

(51) Int. Cl.
| *H04W 24/02* | (2009.01) |
| *H04L 41/0681* | (2022.01) |
| *H04L 41/22* | (2022.01) |
| *H04L 43/045* | (2022.01) |

(52) U.S. Cl.
CPC ......... *H04W 24/02* (2013.01); *H04L 41/0681* (2013.01); *H04L 41/22* (2013.01); *H04L 43/045* (2013.01)

(58) Field of Classification Search
CPC ............. H04L 41/22; H04L 43/04–067; H04L 43/0876–091; H04L 43/16; H04L 43/045; H04W 24/04–10
See application file for complete search history.

(56) References Cited

U.S. PATENT DOCUMENTS

| 9,924,367 B2 * | 3/2018 | Kapnadak | ............... | H04L 43/16 |
| 10,498,610 B1 * | 12/2019 | Kenig | ................. | H04L 41/0654 |
| 10,673,714 B1 * | 6/2020 | Chitalia | .............. | H04L 43/0876 |
| 11,343,373 B1 | 5/2022 | Bodiga et al. | | |
| 11,876,688 B1 * | 1/2024 | Rehman | .............. | H04L 41/0894 |
| 12,058,543 B2 * | 8/2024 | Chou | .................... | H04W 24/04 |
| 2006/0245432 A1 * | 11/2006 | Kroboth | ................ | H04L 43/045 370/395.21 |
| 2011/0243124 A1 * | 10/2011 | Huntley | ................ | H04M 15/72 370/352 |
| 2013/0040683 A1 * | 2/2013 | Siomina | ................ | H04W 24/08 455/517 |
| 2015/0103769 A1 * | 4/2015 | Kaichis | ................. | H04W 16/04 370/329 |
| 2015/0207700 A1 * | 7/2015 | Elmdahl | ................. | H04L 43/04 370/241.1 |

(Continued)

*Primary Examiner* — Brendan Y Higa

(74) *Attorney, Agent, or Firm* — Shook, Hardy & Bacon L.L.P.

(57) ABSTRACT

The technology disclosed herein relates to dashboards for a multi-network management system. In embodiments, the multi-network management system that is in communication with a plurality of network managers can receive at least one key performance indicators (KPI) for each radio access network (RAN) node of each of the plurality of network managers (e.g., wherein each of the plurality of network managers are managing a plurality of RAN nodes). The multi-network management system can also determine a capacity for each of the plurality of network managers based on the at least one KPI received. In embodiments, the capacity can also be determined based on the RAN node capabilities associated with each network manager. Accordingly, a dashboard can be displayed, via a user interface, the dashboard comprising a capacity icon for a determined capacity of a network manager.

19 Claims, 12 Drawing Sheets

(56)        References Cited

U.S. PATENT DOCUMENTS

| | | | | |
|---|---|---|---|---|
| 2015/0257051 A1* | 9/2015 | Rao | H04W 48/16 | |
| | | | | 455/552.1 |
| 2016/0014665 A1* | 1/2016 | Centonza | H04W 36/304 | |
| | | | | 455/436 |
| 2016/0043814 A1* | 2/2016 | Bishop | H04L 43/06 | |
| | | | | 370/242 |
| 2016/0044702 A1* | 2/2016 | Centonza | H04W 24/08 | |
| | | | | 370/328 |
| 2016/0183109 A1* | 6/2016 | Kiesekamp | H04L 41/22 | |
| | | | | 370/252 |
| 2017/0201428 A1* | 7/2017 | Normandin | H04L 43/08 | |
| 2019/0182125 A1* | 6/2019 | Neisinger | H04L 41/147 | |
| 2019/0327185 A1* | 10/2019 | Hassan | H04L 47/822 | |
| 2020/0351201 A1* | 11/2020 | Li | G06F 11/3006 | |
| 2021/0243652 A1* | 8/2021 | Yao | H04W 48/18 | |
| 2022/0038923 A1 | 2/2022 | Lee | | |
| 2022/0094609 A1* | 3/2022 | Guntuku | G06F 3/04847 | |
| 2022/0239395 A1 | 7/2022 | Khafizov et al. | | |
| 2023/0121268 A1* | 4/2023 | Mueller | H04L 41/0896 | |
| | | | | 370/229 |
| 2023/0213920 A1* | 7/2023 | Kallus | G05B 19/4183 | |
| | | | | 702/188 |
| 2023/0231776 A1* | 7/2023 | Wang | H04L 43/0876 | |
| | | | | 715/736 |
| 2023/0300042 A1* | 9/2023 | Kumar | H04L 41/5009 | |
| | | | | 455/456.1 |
| 2024/0205748 A1* | 6/2024 | Palapati | H04W 28/086 | |
| 2024/0354681 A1* | 10/2024 | Sharma | G06Q 10/0639 | |

* cited by examiner

OSS > OSS MCPH Utilization Gauge date 03202023 ▶

| CROSS Utilization | C5OSS Utilization | SROSS Utilization | S2OSS Utilization | S6OSS Utilization |
| --- | --- | --- | --- | --- |
| 165% | 167% | 66% | 144% | 21% |

| T2OSS Utilization | T3OSS Utilization | T4OSS Utilization | T5OSS Utilization | T6OSS Utilization |
| --- | --- | --- | --- | --- |
| 60% | 73% | 125% | 143% | 100% |

| T7OSS Utilization | T8OSS Utilization | TCOSS Utilization | TDOSS Utilization | TEOSS Utilization |
| --- | --- | --- | --- | --- |
| 110% | 65% | 82% | 12% | 44% |

| TFOSS Utilization | TGOSS Utilization | THOSS Utilization | TIOSS Utilization | TJOSS Utilization |
| --- | --- | --- | --- | --- |
| 10% | 44% | 34% | 22% | 64% |

| TKOSS Utilization | W2OSS Utilization | W3OSS Utilization | W4OSS Utilization | W6OSS Utilization |
| --- | --- | --- | --- | --- |
| N/A | 77% | 133% | 46% | 164% |

OSS > OSS Network Capacity Per Technol...

Last 6 hours

Network Cell Capacity

| id | system | actual_si... | TRX_c... | TRX_Normaliz... | WCDMA... | WCDMA_Normaliz... | LNCEL_C... | NRCELL_C... | NBIOT_C... | NBIOT_Total... | NBIOT_Norm... | norm_t... | norm_c... | norm_tot... |
|---|---|---|---|---|---|---|---|---|---|---|---|---|---|---|
| 1611 | cross | XXL+ | 4208 | 1389 | 3 | 2 | 29933 | 20392 | 6068 | | 1214 | 52929 | 72000 | 74% |
| 1612 | c5oss | XXL+ | 5101 | 1683 | 1556 | 778 | 28318 | 21874 | 7595 | | 1519 | 54172 | 72000 | 75% |
| 1613 | sross | XXL+ | 1868 | 616 | 0 | 0 | 12848 | 7130 | 3146 | | 629 | 21224 | 72000 | 29% |
| 1614 | s2oss | XXL+ | 2915 | 962 | 17 | 0 | 26756 | 13598 | 5100 | | 1020 | 42344 | 72000 | 59% |
| 1615 | s6oss | XXL+ | 1311 | 433 | 0 | 0 | 6532 | 1096 | 1679 | | 336 | 8396 | 72000 | 12% |
| 1616 | t2oss | 3XL+100K | 3350 | 1106 | 72 | 36 | 38814 | 14202 | 5617 | | 1123 | 55281 | 100000 | 55% |
| 1617 | t3oss | XXL+Bypass | 3641 | 1202 | 1416 | 708 | 236490895 | 5010700... | 7827 | | 1565 | 73756... | 80000 | 92195 |
| 1618 | t4oss | XXL+ | 3030 | 1000 | 52 | 26 | 26745 | 11681 | 4165 | | 833 | 40285 | 72000 | 56% |
| 1619 | t5oss | XXL+ | 4740 | 1564 | 0 | 0 | 29756 | 17957 | 6680 | | 1336 | 50613 | 72000 | 70% |
| 1620 | t6oss | XXL | 2765 | 912 | 0 | 0 | 19587 | 11120 | 4233 | | 847 | 32466 | 72000 | 45% |
| 1621 | t7oss | XXL | 2564 | 846 | 225 | 113 | 23663 | 9629 | 4023 | | 805 | 35055 | 72000 | 49% |
| 1622 | t8oss | XXL | 1735 | 573 | 710 | 355 | 12245 | 8130 | 3227 | | 645 | 21748 | 72000 | 30% |
| 1623 | tcoss | XXLBypass | 4905 | 1619 | 1797 | 899 | 2592548... | 3 | 7175 | | 1435 | 259259... | 80000 | 32407 |
| 1624 | tdoss | XXL | 778 | 257 | 56 | 28 | 4121 | 323 | 582 | | 116 | 4845 | 72000 | 7% |
| 1625 | teoss | 3XL | 2529 | 835 | 2450 | 1225 | 25247 | 10397 | 4928 | | 986 | 36689 | 72000 | 54% |
| 1626 | tfoss | 3XL | 782 | 258 | 25 | 13 | 7946 | 749 | 1668 | | 334 | 9299 | 72000 | 13% |
| 1627 | tgoss | 3XL | 2583 | 852 | 252 | 126 | 26749 | 9894 | 4082 | | 816 | 38438 | 72000 | 53% |
| 1628 | thoss | 3XL | 1990 | 657 | 97 | 49 | 18765 | 9574 | 3963 | | 793 | 29837 | 72000 | 41% |
| 1629 | tioss | 3XL | 1974 | 651 | 0 | 0 | 13885 | 5153 | 2592 | | 518 | 20208 | 72000 | 28% |
| 1630 | tjoss | 3XL | 4256 | 1404 | 1644 | 822 | 34282 | 19538 | 7614 | | 1523 | 57569 | 72000 | 80% |
| 1631 | tkoss | 3XL | 0 | 0 | 0 | | 0 | 0 | 0 | | 0 | 0 | 72000 | % |
| 1632 | w2oss | XXL+Bypass | 6457 | 2131 | 1300 | 650 | 39821 | 25653 | 9329 | | 1866 | 70121 | 100000 | 70% |
| 1633 | w3oss | XXL+ | 3171 | 1046 | 0 | 0 | 26274 | 12838 | 4681 | | 936 | 41095 | 72000 | 57% |

*FIG. 5.*

OSS > OSS BTS Count Table

RAN OSS BTS Count per Technology

| id | system | date | bsc | bts | mc | wbts | lnbts | nrbts | total_bts |
|---|---|---|---|---|---|---|---|---|---|
| 11534 | cross | 03202023 | 3 | 4217 | 3 | 976 | 3029 | 1749 | 9971 |
| 11535 | c5oss | 03202023 | 3 | 5127 | 4 | 1167 | 3815 | 2267 | 12376 |
| 11536 | sross | 03202023 | 1 | 1870 | 2 | 179 | 1506 | 818 | 4373 |
| 11537 | s2oss | 03202023 | 1 | 2992 | 4 | 566 | 2903 | 1428 | 7889 |
| 11538 | s6oss | 03202023 | 3 | 1306 | 4 | 814 | 968 | 195 | 3283 |
| 11539 | t2oss | 03202023 | 3 | 3303 | 2 | 1122 | 3673 | 1452 | 9550 |
| 11540 | t3oss | 03202023 | 2 | 3607 | 2 | 1410 | 3741 | 2342 | 11100 |
| 11541 | t4oss | 03202023 | 1 | 3071 | 1 | 674 | 2292 | 1138 | 7175 |
| 11542 | t5oss | 03202023 | 2 | 4750 | 2 | 500 | 3313 | 1884 | 10447 |
| 11543 | t6oss | 03202023 | 2 | 2777 | 2 | 599 | 3157 | 1242 | 775 |
| 11544 | t7oss | 03202023 | 1 | 2639 | 1 | 599 | 3157 | 1242 | 775 |
| 11545 | t8oss | 03202023 | 1 | 1719 | 3 | 551 | 1624 | 998 | 4892 |
| 11546 | tcoss | 03202023 | 3 | 4933 | 2 | 701 | 3930 | 2139 | 11703 |
| 11547 | tdoss | 03202023 | 3 | 776 | 2 | 22 | 434 | 79 | 1311 |
| 11548 | teoss | 03202023 | 1 | 2558 | 2 | 881 | 2431 | 1176 | 7046 |
| 11549 | tfoss | 03202023 | 2 | 782 | 8 | 867 | 1475 | 142 | 3266 |
| 11550 | tgoss | 03202023 | 1 | 2619 | 1 | 107 | 2975 | 963 | 6564 |
| 11551 | thoss | 03202023 | 1 | 1993 | 1 | 366 | 1906 | 1186 | 5451 |
| 11552 | tioss | 03202023 | 1 | 1996 | 1 | 387 | 1287 | 674 | 4344 |
| 11553 | tjoss | 03202023 | 3 | 4239 | 2 | 1598 | 3860 | 2026 | 11723 |
| 11554 | tkoss | 03202023 | 0 | 0 | 0 | 0 | 0 | 0 | 0 |
| 11555 | w2oss | 03202023 | 3 | 6471 | 3 | 1391 | 51224 | 2657 | 15643 |

600

OSS > RAN OSS Capacity Table

☆ ⚙ 🖫 🗖 ✳ | ⬆ ☆ 🗖 🗖 | ⊙ Last 6 hours ▾ 🔍 ↻ ▶

Network Cell Capacity

| id | system | nct_size | actual_size | netact_util | norm_total | norm_cap | norm_total_util | con_event_per_min | con_event_cap | con_event_cap | con_event_util | mcph | mcph_cap | mcph_util | fm_event_per_sec | fm_event_cap | fm_event_util |
|---|---|---|---|---|---|---|---|---|---|---|---|---|---|---|---|---|---|
| 1611 | cross | xxl | XXL+ | 63% | 52929 | 72000 | 74% | 1489 | 1000 | 1000 | 149% | 1238141867 | 1000000000 | 165% | 1 | 75 | 1% |
| 16112 | c5oss | xxl | XXL+ | 68% | 54172 | 72000 | 75% | 1079 | 1000 | 1000 | 108% | 1254591463 | 1000000000 | 167% | 3 | 75 | 4% |
| 16113 | sross | xxl | XXL+ | 31% | 21224 | 72000 | 29% | 704 | 1000 | 1000 | 70% | 494394633 | 1000000000 | 66% | 0 | 75 | 0% |
| 16114 | s2oss | xxl | XXL+ | 57% | 42344 | 72000 | 59% | 1648 | 1000 | 1000 | 165% | 1078499384 | 1000000000 | 144% | 1 | 75 | 3% |
| 16115 | s6oss | xxl | XXL+ | 16% | 8396 | 72000 | 12% | 289 | 1000 | 1000 | 29% | 157576593 | 1000000000 | 21% | 0 | 75 | 0% |
| 16116 | t2oss | 3XL | 3XL+100K | 41% | 55281 | 100000 | 55% | 2033 | 2000 | 2000 | 34% | 1193240216 | 500000000 | 60% | 0 | 75 | 0% |
| 16117 | t3oss | 3XL | XL+Bypass | 45% | 73756… | 80000 | 92195 | 2328 | 1000 | 1000 | 39% | 1460679071 | 500000000 | 73% | 1 | 75 | 2% |
| 16118 | t4oss | xxl | XXL+ | 50% | 40285 | 72000 | 56% | 1366 | 1000 | 1000 | 137% | 935239705 | 1000000000 | 125% | 2 | 75 | 3% |
| 16119 | t5oss | xxl | XXL+ | 53% | 50613 | 72000 | 70% | 1693 | 1000 | 1000 | 169% | 1074190105 | 1000000000 | 143% | 1 | 75 | 2% |
| 16120 | t6oss | xxl | XXL | 41% | 32466 | 72000 | 45% | 563 | 1000 | 1000 | 56% | 748092147 | 750000000 | 100% | 0 | 75 | 0% |
| 16121 | t7oss | xxl | XXL | 41% | 35055 | 72000 | 49% | 0 | 1000 | 1000 | 0% | 825252564 | 750000000 | 110% | 0 | 75 | 0% |
| 16122 | t8oss | xxl | XXL | 33% | 21748 | 72000 | 30% | 795 | 1000 | 1000 | 80% | 484250760 | 750000000 | 65% | 0 | 75 | 0% |
| 16123 | tcoss | XXLBypass | XXLBypass | 62% | 259259… | 80000 | 32407 | 2908 | 1000 | 1000 | 48% | 1639255177 | 500000000 | 82% | 1 | 75 | 2% |
| 16124 | tdoss | XXL | XXL | 13% | 4845 | 72000 | 7% | 145 | 1000 | 1000 | 14% | 88360579 | 750000000 | 12% | 0 | 75 | 0% |
| 16125 | teoss | 3XL | 3XL | 33% | 38689 | 72000 | 54% | 1408 | 6000 | 6000 | 23% | 875134733 | 2000000000 | 44% | 1 | 75 | 2% |
| 16126 | tfoss | 3XL | 3XL | 13% | 9299 | 72000 | 13% | 430 | 6000 | 6000 | 7% | 192823395 | 2000000000 | 10% | 0 | 75 | 0% |
| 16127 | tgoss | 3XL | 3XL | 30% | 38438 | 72000 | 53% | 1516 | 6000 | 6000 | 25% | 880705001 | 2000000000 | 44% | 1 | 75 | 2% |
| 16128 | thoss | 3XL | 3XL | 24% | 29837 | 72000 | 41% | 1138 | 6000 | 6000 | 19% | 672518798 | 2000000000 | 34% | 0 | 75 | 0% |
| 16129 | tioss | 3XL | 3XL | 17% | 20208 | 72000 | 28% | 687 | 6000 | 6000 | 11% | 450553716 | 2000000000 | 22% | 0 | 75 | 1% |
| 16130 | tjoss | 3XL | 3XL | 44% | 57569 | 72000 | 80% | 2000 | 6000 | 6000 | 33% | 1278169448 | 2000000000 | 64% | 1 | 75 | 2% |
| 16131 | tkoss | | 3XL | % | 0 | 72000 | % | 0 | 6000 | 6000 | % | 0 | 2000000000 | % | 0 | 75 | % |

OSS > USD/PaCo OSS Capacity Table

USD/PaCo NetAct OSS Capacity All

Last 6 hours

| id | system | date | nct_size | actual_size | netact_util | mcph | mcph_cap | mcph_util | pm_files | pm_files_cap | pm_files_util | ccn_event_per_min | ccn_event_cap | ccn_event_util | fm_event_per_sec | fm_event_cap | fm_event_util |
|---|---|---|---|---|---|---|---|---|---|---|---|---|---|---|---|---|---|
| 408 | d1oss | 03202023 | L | L | 21% | 168949937 | 555000000 | 39% | 2293 | 52000 | 2% | 0 | 1000 | 0% | 12 | 75 | 17% |
| 409 | p1oss | 03202023 | L | L | 23% | 169088960 | 555000000 | 39% | 2258 | 52000 | 2% | 0 | 1000 | 0% | 3 | 75 | 4% |
| 410 | d2oss | 03202023 | L | L | 9% | 9287897 | 555000000 | 2% | 944 | 52000 | 0% | 0 | 1000 | 0% | 21 | 75 | 29% |
| 411 | p2oss | 03202023 | L | L | 11% | 9289764 | 555000000 | 2% | 948 | 52000 | 0% | 0 | 1000 | 0% | 25 | 75 | 34% |
| 412 | a3oss | 03202023 | L | L | 9% | 22112319 | 555000000 | 5% | 2160 | 52000 | 2% | 0 | 1000 | 0% | 5 | 75 | 8% |
| 413 | p3oss | 03202023 | L | L | 8% | 23015785 | 555000000 | 5% | 2235 | 52000 | 2% | 0 | 1000 | 0% | 5 | 75 | 8% |
| 414 | a4oss | 03202023 | L | L | 18% | 15959601 | 555000000 | 3% | 10365 | 52000 | 9% | 0 | 1000 | 0% | 10 | 75 | 14% |
| 415 | p4oss | 03202023 | L | L | 17% | 16016015 | 555000000 | 4% | 10487 | 52000 | 9% | 0 | 1000 | 0% | 10 | 75 | 14% |
| 416 | d5oss | 03202023 | 3XL | 3XL | 32% | 65842132 | 2000000000 | 3% | 123680 | 144000 | 85% | 0 | 6000 | 0% | 1 | 75 | 2% |
| 417 | p5oss | 03202023 | 3XL | 3XL | 7% | 4597587 | 2000000000 | 0% | 10773 | 144000 | 7% | 0 | 6000 | 0% | 1 | 75 | 2% |
| 418 | t1oss | 03202023 | L | L | 8% | 14011866 | 555000000 | 3% | 1994 | 52000 | 1% | 0 | 1000 | 0% | 0 | 75 | 1% |

OSS > RAN Normalized Network Utilization Gau...

date 03202023 ▼

Last 6 hours ▼

| CROSS Utilization 74% | C5OSS Utilization 75% | SROSS Utilization 29% | S2OSS Utilization 59% | S6OSS Utilization 12% | T2OSS Utilization 55% | T3OSS Utilization 92195% | T4OSS Utilization 56% |
| T5OSS Utilization 70% | T6OSS Utilization 45% | T7OSS Utilization 49% | T8OSS Utilization 30% | TCOSS Utilization 32407% | TDOSS Utilization 7% | TEOSS Utilization 54% | TFOSS Utilization 13% |
| TGOSS Utilization 53% | THOSS Utilization 41% | TIOSS Utilization 28% | TJOSS Utilization 80% | TKOSS Utilization N/A | W2OSS Utilization 70% | W3OSS Utilization 57% | W4OSS Utilization 53% |
| W6OSS Utilization 74% | W7OSS Utilization 53% | | | | | | |

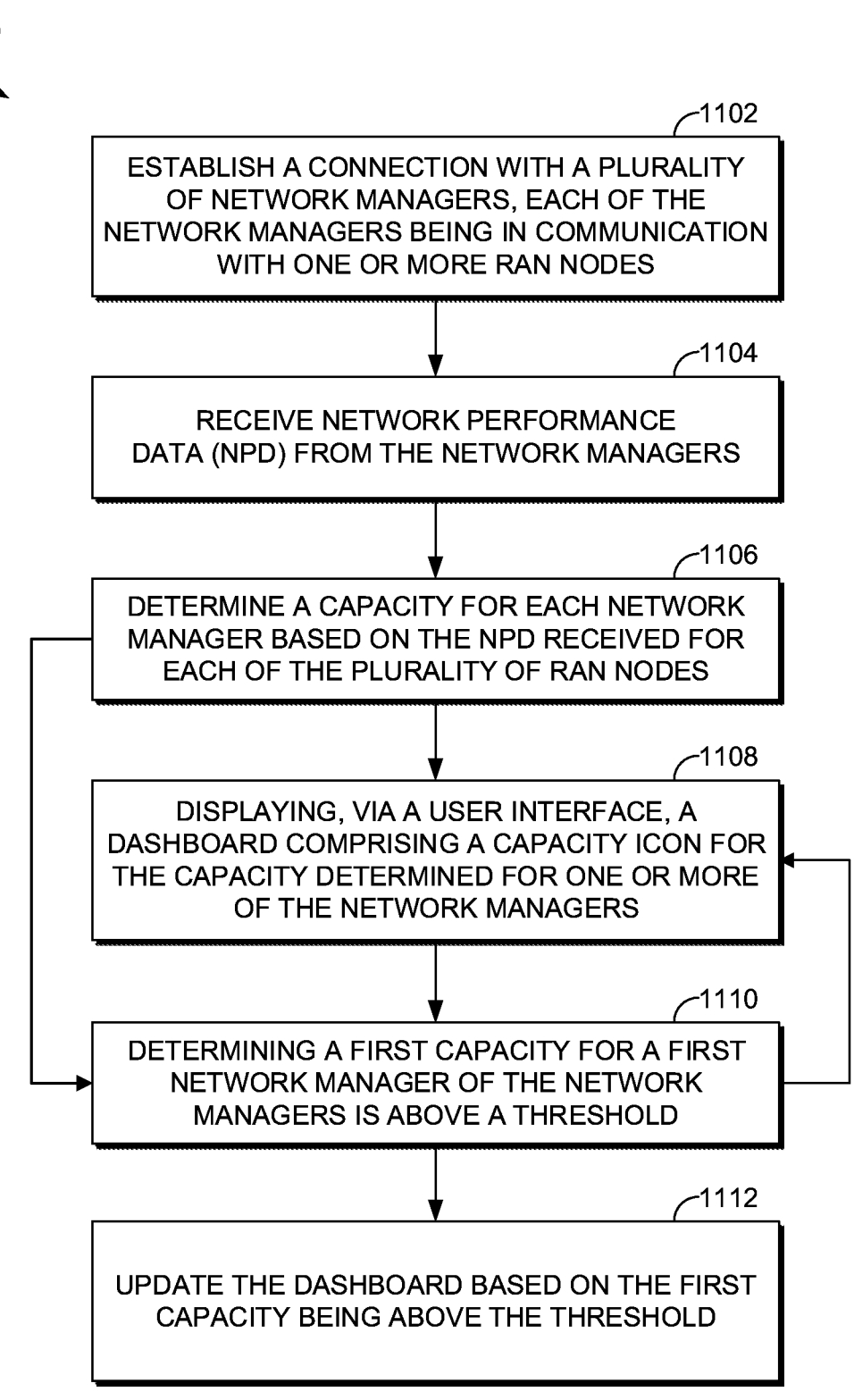

1102

ESTABLISH A CONNECTION WITH A PLURALITY OF NETWORK MANAGERS, EACH OF THE NETWORK MANAGERS BEING IN COMMUNICATION WITH ONE OR MORE RAN NODES

1104

RECEIVE NETWORK PERFORMANCE DATA (NPD) FROM THE NETWORK MANAGERS

1106

DETERMINE A CAPACITY FOR EACH NETWORK MANAGER BASED ON THE NPD RECEIVED FOR EACH OF THE PLURALITY OF RAN NODES

1108

DISPLAYING, VIA A USER INTERFACE, A DASHBOARD COMPRISING A CAPACITY ICON FOR THE CAPACITY DETERMINED FOR ONE OR MORE OF THE NETWORK MANAGERS

1110

DETERMINING A FIRST CAPACITY FOR A FIRST NETWORK MANAGER OF THE NETWORK MANAGERS IS ABOVE A THRESHOLD

1112

UPDATE THE DASHBOARD BASED ON THE FIRST CAPACITY BEING ABOVE THE THRESHOLD

MEMORY
1204

PROCESSOR(S)
1206

PRESENTATION
COMPONENT(S)
1208

RADIO(S)
1216

I/O PORT(S)
1210

I/O COMPONENTS
1212

POWER SUPPLY
1214

1202

CAPACITY DASHBOARD FOR NETWORK MANAGEMENT SYSTEMS

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with a capacity dashboard for a multi-network management system, substantially as shown in and/or described in connection with at least one of the figures, and as set forth more completely in the claims.

In aspects set forth herein, and at a high level, the technology described herein relates to capacity dashboards for a multi-network management system that is in communication with a plurality of network managers that are each in communication with one or more radio access network (RAN) nodes. In some embodiments, the multi-network management system is in communication with over forty network managers. The multi-network management system can be configured to perform operations comprising receiving at least one key performance indicator (KPI) for each of the plurality of RAN nodes and identifying a network manager of the plurality of network managers for each of the plurality of RAN nodes. The multi-network management system can also determine a capacity for each of the plurality of network managers based on the at least one KPI received for each of the plurality of RAN nodes and based on identifying the network manager for each of the plurality of RAN nodes.

In some embodiments, a capacity for a network manager can also be determined based on identifying RAN node capabilities and operating configurations for each of the plurality of RAN nodes for each of the plurality of network managers. In some embodiments, the multi-network management system can determine a first capacity for a first network manager of the plurality of network managers is above a threshold. In embodiments, the multi-network management system can determine that the first capacity is increasing at a rate above a predetermined threshold rate. In some embodiments, the multi-network management system can determine a second capacity for a second network manager of the plurality of network managers is within a predetermined range that is approaching the threshold. In embodiments, the threshold can be determined based on historical KPIs of each of the plurality of network managers, RAN node capabilities, RAN node operating configurations for each of the plurality of RAN nodes that correspond to each network manager of the plurality of network managers, another threshold indicator, or one or more combinations thereof.

As such, the multi-network management system can display (or cause the display of) a dashboard, via a user interface, the dashboard comprising a capacity icon for the capacity determined for one or more of the plurality of network managers. Each capacity icon displayed on the dashboard can be organized on the dashboard based on at least one identifier for each of the plurality of network managers (e.g., a network manager location identifier, a RAN node identifier for each of the RAN nodes in communication with a network manager, another type of network manager identifier). In some embodiments, the capacity icon for each of the plurality of network managers is displayed on the dashboard in an ascending order from a highest capacity utilization to a lowest capacity utilization. In some embodiments, the capacity icon for the highest capacity utilization is visually different from the capacity icon for the lowest capacity utilization. In some embodiments, an alert is provided for the first capacity on the dashboard based on determining the first capacity for the first network manager is above the threshold.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIGS. 2-10 depict example embodiments of the capacity dashboard, in accordance with aspects herein;

FIG. 11 illustrates an example flowchart for providing the capacity dashboard, in accordance with aspects herein.

DETAILED DESCRIPTION

Figure 1:
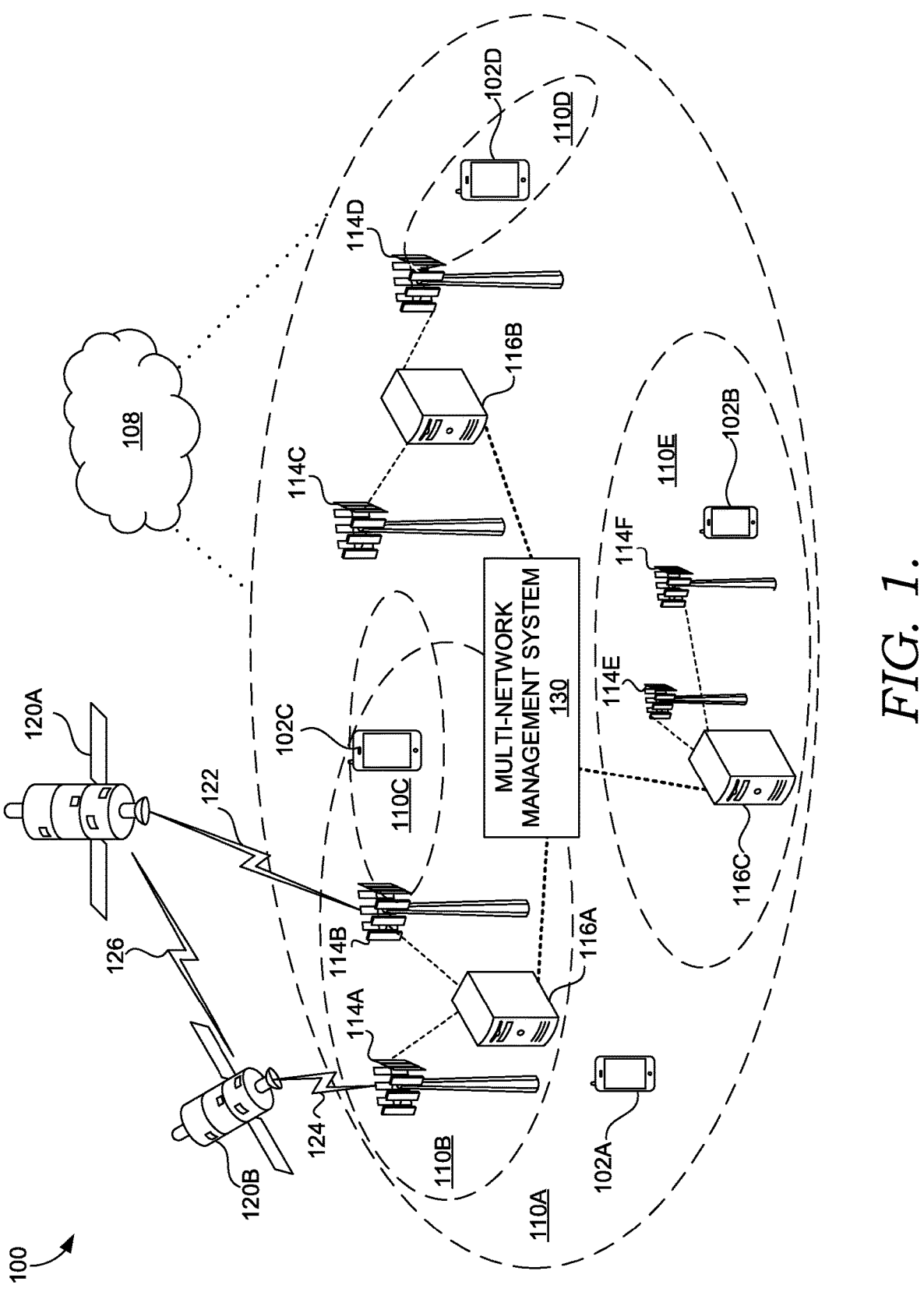
FIG. 1 depicts an example operating environment for the multi-network management system capacity dashboard, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
CQI Channel Quality Information
CS Circuit Switch
CSF Channel State Feedback CSI Channel State Information
D2D Device-to-Device
eNB Evolved Node B
gNB Next Generation Node B
GPRS General Packet Radio Service
GSM Global System for Mobile communications
DVD Digital Versatile Discs
EEPROM Electrically Erasable Programmable Read
    Only Memory
eMBB enhanced Mobile Broadband
EMS Enhanced Messaging Service
E-RAB E-UTRAN Radio Access Bearer
E-UTRAN Evolved Universal Terrestrial Radio Access
    Network
FD-MIMO Full-Dimension Multiple-Input Multiple-Output
GPS Global Positioning System
GSM Global Standards for Mobile communications
IoT Internet of Things
KPI Key Performance Indicator
LAN Local Area Network
LTE Long Term Evolution
MCS Modulation Coding Scheme
MIMO Multiple-Input Multiple-Output
mm wave Millimeter wave
MME Mobility Management Entity
MMS Multimedia Messaging Service
mMTC massive Machine Type Communications
MU-MIMO Multi-User Multiple-Input Multiple-Output
NR New Radio
P2P Peer-to-Peer
PC Personal Computer
PDA Personal Digital Assistant
PDP Packet Data Protocol
QOS Quality of Service
RAM Random Access Memory
RAN Radio Access Network
RAT Radio Access Technology
RBS Radio Base Station
RF Radio-Frequency
ROM Read Only Memory
RRC Radio Resource Control
RSRP Reference Signal Received Power
RSRQ Reference Transmission Receive Quality
RSSI Received Signal Strength Indicator
SDCCH Stand-alone Dedicated Control Channel
SINR Signal to Interference and Noise Ratio
SMS Short Message Service
SNR Signal-to-Noise Ratio
SRS Sound Reference Signal
TCH Traffic Channel
TDMA Time Division Multiple Access
UE User Equipment
UMTS Universal Mobile Telecommunications System
URLLC Ultra-Reliable Low Latency Communications
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a mm wave transmission includes one or more frequency ranges of 24 GHZ, 26 GHZ, 28 GHZ, 39 GHZ, and 52.6-71 GHz.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in some embodiments, similar to user devices 102A-102D described herein with respect to FIG. 1 or similar to user device 1200 described herein with respect to FIG. 12.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Telecommunication service" refers to the transfer of information (e.g., without the use of an electrical conductor as the transferring medium). Telecommunication services may be provided by one or more telecommunication network providers. Telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides telecommunication services comprising one or more of a voice service, a message service (e.g., SMS messages, MMS messages, instant messaging messages, an EMS service messages), a data service, other types of telecommunication services, or one or more combinations thereof, to user devices or corresponding users that are registered or subscribed to a telecommunication service provider to utilize the one or more services. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more RAN nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. In some embodiments, a RAN node is a base station. A base station may be, in some embodiments, similar to base stations 114A-114F described herein with respect to FIG. 1.

In embodiments, the "RAN node" may refer to a base transceiver station, a radio base station, an access point, a radio transceiver, a NodeB, an eNB, a gNB, a Home NodeB, a Home eNodeB, another type base station, or one or more combinations thereof. The RAN node may comprise one or more of a macro base station, a small cell or femtocell base station, a relay base station, another type of base station, or one or more combinations thereof. In aspects, the RAN node may be configured as FD-MIMO, massive MIMO, MU-MIMO, cooperative MIMO, 3G, 4G, 5G, another generation communication system, or one or more combinations thereof. In addition, the RAN node may operate in an extremely high frequency region of the spectrum (e.g., from 30 GHz to 300 GHz), also known as the millimeter band.

In embodiments, RAN node capabilities and RAN node operating configurations for a RAN node may correspond to the FD-MIMO, massive MIMO, MU-MIMO, cooperative MIMO, 3G, 4G, 5G, another generation communication system, or one or more combinations thereof. Additionally or alternatively, RAN node capabilities and RAN node operating configurations may correspond to operations in the extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with managing telecommunication services provided by base station nodes. For example, prior relevant technologies have not provided a multi-network management system capable of communicating with a plurality of network operation systems and base station nodes corresponding to the network operation systems. As another example, these prior relevant technologies have not provided recommendations, alerts, or notifications for particular operations of particular network operations systems and particular base station nodes based on receiving particular network performance data, such as an indication to modify an operation associated with a rate at which the network operation system receives the network performance data. As such, these prior relevant technologies have had challenges that involve base station node degradation that has been undetected or that has not been remedied. Accordingly, these prior relevant technologies can involve signal fading, decreased throughput, and decreases in quality of service and user device experiences.

The technology provided herein can alleviate the problems discussed above. For example, the technology disclosed herein enhances network resource utilization, decreases signal fading, increases uplink and downlink throughput, and improves communications between or among user devices by improving quality of service and user device experience. Further, the technology and corresponding techniques can enhance the reliability and functionality of communications. In an embodiment, a method is provided for a capacity management dashboard. The method comprises receiving, via a multi-network management system in communication with a plurality of network managers, at least one KPI for each RAN node of each of the plurality of network managers, wherein each of the plurality of network managers are managing a plurality of RAN nodes. The method also comprises identifying, via the multi-network management system, RAN node capabilities and operating configurations for each of the plurality of RAN nodes for each of the plurality of network managers. The method also comprises determining, via the multi-network management system, a capacity for each of the plurality of network managers based on the at least one KPI received and based on identifying the RAN node capabilities and the operating configurations. The method also comprises displaying, via a user interface, a dashboard comprising a capacity icon for the capacity determined for each of the plurality of network managers, wherein the capacity icon for each of the plurality of network managers is displayed on the dashboard based on an identifier for each of the plurality of network managers.

In another embodiment, a system is provided for a capacity management dashboard. The system comprises a plurality of radio access network (RAN) nodes. The system also comprises a plurality of network managers that are each in communication with one or more of the plurality of RAN nodes. The system also comprises a multi-network management system capable of communicating with the plurality of network managers for capacity management of the plurality of RAN nodes based on key performance indicators (KPIs), the multi-network management system configured to perform operations. Those operations include receiving at least one KPI for each of the plurality of RAN nodes. The operations also include identifying a network manager of the plurality of network managers for each of the plurality of RAN nodes. The operations also include determining a capacity for each of the plurality of network managers based on the at least one KPI received for each of the plurality of RAN nodes and based on identifying the network manager for each of the plurality of RAN nodes. The operations also include displaying, via a user interface, a dashboard comprising a capacity icon for the capacity determined for each of the plurality of network managers, wherein the capacity icon for each of the plurality of network managers is displayed on the dashboard based on at least one identifier for each of the plurality of network managers.

In yet another embodiment, computer storage media is provided for capacity management. For example, one or more non-transitory computer storage media having computer-executable instructions embodied thereon, that when executed by at least one processor, cause the at least one processor to perform a method. The method includes receiving, via a multi-network management system in communication with a plurality of network managers, at least one KPI for each RAN node of each of the plurality of network managers, wherein each of the plurality of network managers are managing a plurality of RAN nodes, and wherein the at least one KPI for each RAN node is received in real-time. The method also includes identifying, via the multi-network management system, each network manager of the plurality of network managers. The method also includes storing the at least one KPI received in real-time for each of the identified network managers. The method also includes determining, via the multi-network management system, a capacity for each of the plurality of network managers based on the at least one KPI received and based on identifying each network manager. The method also includes causing to display, on a user interface, a dashboard comprising a capacity icon for the capacity determined for each of the plurality of network managers, wherein the capacity icon for each of the plurality of network managers is displayed on the dashboard based on an identifier for each of the plurality of network managers.

Those skilled in the art will appreciate that the computing devices described herein need not be limited to conventional personal computers, and can include other computing configurations, including servers, hand-held devices, multiprocessor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example operating environment 100 supports the multi-network management system within one or more telecommunications networks, in accordance with one or more embodiments disclosed herein. Example environment 100 is but one example of a suitable environment for the multi-network management system and the associated techniques disclosed herein, and is not intended to suggest any limitation as to the scope of use or functionality of the invention. Neither should the environment 100 be interpreted as having any dependency or requirement relating to any one or combination of components illustrated. For example, in some embodiments, the example operating environment 100 can include additional components not depicted.

Example operating environment 100 includes user devices 102A-102D, network 108, coverage areas 110A-110E, base stations 114A-114F, network managers 116A-116C, satellites 120A and 120B, communication link 124 corresponding to satellite 120B and base station 114A, communication link 122 corresponding to satellite 120A and base station 114B, communication link 126 between satellites 120A and 120B, and multi-network management system 130. Example operational environment 100 is but one example environment for the multi-network management system 130. For example, another embodiment may include additional base stations.

Example operating environment 100 having network 108 and coverage area 110A may be associated with one or more of a non-terrestrial network, an LTE network, an LTE-A network, an LTE-A Pro network, an NR network, a mm wave network, another type of network, or one or more combinations thereof. In some embodiments, the example operating environment 100 may support enhanced broadband communications, ultra-reliable (e.g., mission critical) communications, low latency communications, communications with low-cost and low-complexity devices, another type of communication, or one or more combinations thereof. In some embodiments, one or more communications between one or more devices in example operating environment 100 may correspond to the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more communications corresponding to the multi-network management system 130 may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof.

In embodiments, user devices 102A-102D may wirelessly communicate via one or more wireless telecommunication services provided by one or more base stations (e.g., user device 102B may wireless communicate via a wireless telecommunication service provided by base station 114E or 114F), one or more satellites (e.g., user device 102A may wireless communicate via a wireless telecommunication service provided by satellite 120A, 120B another satellite, or one or more combinations thereof), other types of wireless telecommunication devices, or one or more combinations thereof. In example environment 100, network 108, base stations 114A-114F, and satellites 120A-120B can provide coverage area 110A for supporting communication signals according to one or more radio access technologies. Supported communication signals within coverage area 110A can include MU-MIMO and SU-MIMO transmissions, for example. As such, one or more communications corresponding to the multi-network management system 130 may correspond to the wireless telecommunication services provided within coverage area 110A.

In embodiments, the user devices 102A-102D can be stationary, mobile, or one or more combinations thereof at different times. The user devices 102A-102D may be able to communicate with various types of devices, such as other UEs, various types of base stations, or various types of network components (e.g., one or more RAN nodes including one or more core network nodes, relay devices, integrated access and backhaul nodes, other types of RAN nodes, or one or more combinations thereof). In embodiments, one or more of the user devices 102A-102D may have different capabilities. For instance, a user device can be wearable devices having a camera, microphone, RFID, GPS, another sensor, or one or more combinations thereof. In some embodiments, a user device is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof.

In embodiments, one or more of the user devices 102A-102D may include one or more of a unit, a station, a terminal, or a client, for example. The user devices 102A-102D may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102D may, at one time or another, act as a relay, base station, (e.g., a UAV acting as an aerial base station), or the network equipment (e.g., macro eNBs or gNBs, small cell eNBs or gNBs, or relay base stations). As such, in some embodiments, one or more signals transmitted from the unit, station, terminal, client, wireless local loop station, IoT device, Internet of Everything device, machine type communication device, evolved or enhanced machine type communication device, user device implemented in an object, another type of user device, or one or more combinations thereof, can be received by the multi-network management system 130 (e.g., through network managers 116A-116C).

Coverage area 110A can provide services from network 108, such as network provider services including the Internet, Intranet, Internet Protocol Multimedia Subsystem, Packet-Switched Streaming Service, another type of network provider service, or one or more combinations thereof. In embodiments, one or more of the user devices 102A-102D, base stations 114A-114F, satellites 120A-120B, multi-network management system 130, or one or more combinations thereof, can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof, associated with the multi-network management system 130. In embodiments, one or more RAN node capabilities and RAN node operating configurations (e.g., a RAN node corresponding to one or more of base stations 114A-114F or one or more of satellites 120A-120B) are associated with one or more of ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof. In some embodiments, one or more RAN node capabilities and RAN node operating configurations correspond to a network provider service (e.g., Internet, Intranet, Internet Protocol Multimedia Subsystem, Packet-Switched Streaming Service).

In embodiments, one or more of the multi-network management system 130, base stations 114A-114F, satellites 120A-120B, or one or more combinations thereof, can communicate with the telecommunications network 108 via a core network, one or more network components (e.g., a core network node, a relay device, an MME, an integrated access and backhaul node, a macro eNB, a small cell eNB, a gNB, a relay base station), or one or more combinations thereof. In some embodiments, one or more of base stations 114A-114F, satellite 120A, satellite 120B, or one or more combinations thereof, communicate with the telecommunications network 108 over one or more backhaul links (e.g., via an X2, Xn, or other interface) either directly (e.g., directly between base stations), or indirectly (e.g., via a core network), or one or more combinations thereof. The backhaul links may be or include one or more wireless links, for example.

In embodiments, RAN nodes including base stations 114A-114F may operate using MIMO transmissions. For example, one or more of the RAN nodes including base stations 114A-114F can be configured as FD-MIMO, massive MIMO, MU-MIMO, cooperative MIMO, 4G, 5G, another generation communication system, or one or more combinations thereof, for providing telecommunication services to one or more of user devices 102A-102D. In embodiments, RAN node capabilities and RAN node operating configurations of a RAN node correspond to one or more FD-MIMO transmissions, massive MIMO transmissions, MU-MIMO transmissions, cooperative MIMO transmissions, 4G transmissions, 5G transmissions, another generation communication system transmission, or one or more combinations thereof.

In embodiments, one or more of the RAN nodes including base stations 114A-114F can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for a non-access stratum message or node selection, a synchronization, radio access network sharing, multimedia broadcast multicast service, subscriber and equipment trace, radio access network information management, paging, positioning, delivery of warning messages, other functions, or one or more combinations thereof. In embodiments, RAN node capabilities and RAN node operating configurations of a RAN node correspond to one or more of these functions.

In some embodiments, one or more RAN node antennas (or antenna arrays) having antenna elements may be co-located at an antenna assembly, such as an antenna tower. In some examples, antennas or antenna arrays associated with the RAN nodes including base stations 114A-114F can be located in diverse geographic locations. In embodiments, antenna elements of one or more antennas may each be within a threshold distance from at least one of the other antenna elements. In some aspects, one or more nodes corresponding to base station 114 may comprise one or more macro cells, one or more small cells, one or more relay base stations, one or more repeaters, one or more femtocells, other types of cells, or one or more combinations thereof. In other embodiments, one or more of the RAN nodes including base stations 114A-114F can be movable, thereby providing communication coverage for a moving geographic coverage area (e.g., coverage area 110D). In some embodiments, one or more antennas of RAN nodes including base stations 114A-114F can use MIMO antenna technology, including spatial multiplexing, beamforming, transmit diversity, other MIMO functions, or one or more combinations thereof.

In embodiments, one of more RAN nodes can include one or more of the satellites 120A-120B, which may communicate with other types of RAN nodes (e.g., the base stations 114A-114F, user devices 102A-102D, or other high altitude or terrestrial RAN nodes). "Satellite" may also be referred to as a space vehicle or communication satellite. Satellites 120A-120B may be any suitable type of communication satellite configured to relay communications between different RAN nodes or RAN end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth. In one non-limiting example, a RAN node may correspond to a geosynchronous earth orbiting satellite with a RAN node capability or a RAN node operating configuration corresponding to multiple service beam coverage areas in a predefined geographical service area.

In some embodiments, the multi-network management system 130 can receive network performance data (e.g., a KPI) from one or more of the satellites 120A and 120B based on the connection between the multi-network management system 130 and one or more of network managers 116A, 116B, and 116C. The multi-network management system 130 may interface with one or more of network managers 116A, 116B, and 116C through one or more wired or wireless backhauls (e.g., via an X2, Xn, or other interface) either directly (e.g., directly between the multi-network management system 130 and network manager 116B), or indirectly (e.g., via core network), or one or more combinations thereof. In some embodiments, the multi-network management system 130 can receive the network performance data (e.g., KPIs) associated with one or more of satellites 120A and 120B (e.g., the space satellite, balloon, dirigible, airplane, drone, unmanned aerial vehicle, multi-beam satellite, other type of satellite, or one or more combinations thereof). For example, the network performance data corresponding to satellite 120A or 120B may include packet metrics including queue length, round trip time between satellite 120A and satellite 120B, round trip time between satellite 120A and base station 114B, round trip time between satellite 120B and base station 114A, round trip time between satellite 120A and user device 102C, round trip time between satellite 120A or satellite 120B and network manager 116A, retry ration, path loss, other types of network performance data, or one or more combinations thereof.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mm wave signals, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof. As such, in some embodiments, the network performance data (e.g., KPIs) corresponding to satellite 120A or 120B and received by multi-network management system 130 may correspond to a measurement of the free space optical link, microwave link, electromagnetic wave signals via mm wave signals, optical signals via laser, wireless common public radio interface protocol, a dedicated wireless front haul protocol developed for high-altitude-to-high-altitude, the other type of communication link, or one or more combinations thereof.

In some embodiments, one or more portions of coverage area 110A (e.g., encompassing coverage areas 110B-110E)

may be provided or established by satellites 120A-120B as part of a non-terrestrial network. Satellites 120A-120B may, in some cases, perform the functions of a base station or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa. As such, in some embodiments, the multi-network management system 130 can receive the network performance data associated with one or more of these types of satellites (e.g., bent-pipe satellite, regenerative satellite, smart satellite, other type of satellite, or one or more combinations thereof). In some embodiments, the network performance data (e.g., a KPI) corresponds to the demodulated signal, decoded signal, re-encoded signal, modulated signal, another type of satellite or regenerative transponder function, or one or more combinations thereof.

Multi-network management system 130 can be configured to communicate with network managers 116A-116C, as well as other network managers or other network components across a plurality of various geographical regions and coverage areas. In some embodiments, the multi-network management system 130 can be located in a core network corresponding to network 108. The multi-network management system 130 can analyze network performance data (e.g., KPIs), determine network performance data outliers, determine a capacity for each of the plurality of network managers based on the network performance data received for each of the plurality of RAN nodes, provide a dashboard, via a graphical user interface, comprising a capacity icon for the capacity determined for each of the network managers, make other types of determinations, provide end-to-end optimization for RAN nodes within a plurality of coverage areas, transmit RAN node operation instructions, transmit alerts, notifications, and recommendations associated with particular RAN nodes within a plurality of coverage areas, provide other operations, or one or more combinations thereof.

In some embodiments, the multi-network management system 130 receives KPIs from each of a plurality of radio access networks that each have a plurality of RAN nodes. In some embodiments, the KPIs received include one or more KPI types. The five tables provided below include several non-exhaustive example KPI types:

TABLE 1

KPIs for the GSM network

| KPI category | Key performance indicators (KPIs) | Definition | Measurement approach | Considerations |
|---|---|---|---|---|
| Availability | Radio coverage-RxLev | Mobile coverage can represents the strength or power level of signal or reception in a given area in which a user device can have access to both data and voice services (e.g., radio coverage measurements [ITU-T E.806]). | Theoretical calculation or Drive test | This parameter can measure the geographic reach of a mobile GSM network. |
| Accessibility | Stand-alone dedicated control channel (SDCCH) assignment success rate | The proportion of user devices which successfully access resources, having requested an appropriate service on accessing the SDCCH (e.g., clause 5.6 of [b-ETSI TR 32.814]). | Real traffic | Secondary This KPI can indicate accessibility for several procedures like call setup, SMS delivery and location update and can also be used to troubleshoot circuit switch (CS) access issues. |
| | Stand-alone dedicated control channel (SDCCH) congestion | The proportion of all SDCCH resource requests and failed due to no SDCCH resource available (e.g., clause 5.7 of [b-ETSI TR 32.814]). | Real traffic | Secondary This KPI can indicate accessibility for several procedures in circuit service. It can show the status of the SDCCH resource utilization. It can also show resource dimensions. When SDCCH is highly congested, TCH utilization can degrade. |
| | Traffic channel (TCH) congestion | The proportion of all requests for TCH resources (call origination and incoming handover) and fail due non available TCH resources (e.g., clause 5.8 of [b-ETSI TR 32.814]). | Real traffic | Primary TCH congestion often increases when traffic demand increases. |
| | Call setup success rate | Measures the proportion of user devices which successfully access a TCH (e.g., clause 5.5 of [b-ETSI TR 32.814]). | Real traffic or test traffic | Primary The preceding KPIs on SDCCH and TCH are sub KPIs of Call Setup Success Rate. Any of the TCH/SDCCH KPIs listed above can impact the call setup success rate. Call setup success rate gives an overview of a call, from initiation to setup. |
| | Packet data protocol (PDP) context activation success rate | Describes the ratio of all successful PDP context activation to PDP context activation attempts (e.g., clause 7.5 of [ETSI TS 132 410]). | Real traffic or test traffic | Secondary Before data is transferred to and from a base station, a PDP context can be activated. With a low or worse PDP context activation, access to data could be a challenge. |
| Retainability | Traffic channel (TCH) drop rate | The proportion of user devices which, having successfully accessed the TCH, subsequently suffer an abnormal release (e.g., clause 5.3 of [b-ETSI TR 32.814]). | Real traffic or test traffic | Primary TCH drop can be perceived by a user as it directly translates to call drop. |

TABLE 1-continued

| | | | | |
|---|---|---|---|---|
| | | KPIs for the GSM network | | |
| KPI category | Key performance indicators (KPIs) | Definition | Measurement approach | Considerations |
| | Handover success rate | The percent of handovers that were attempted from the source cell (cell for which the statistic is presented) that succeeded in making it to the destination cell (e.g., clause 5.4 of [b-ETSI TR 32.814]). | Real traffic or test traffic | Secondary Handover can guarantee call continuity and can indicate influencing factors that include among other things, congestion, coverage, interference, and clocking problems. A poor/low handover success rate could influence other KPIs (e.g., TCH drop). |

TABLE 2

| | | | | |
|---|---|---|---|---|
| | | Example KPIs for UMTS Network | | |
| Category | Key performance indicators (KPIs) | Definition | Measurement approach | Considerations |
| Availability | Radio coverage-Received signal code power (RSCP) | User device coverage can represent the RSCP level of signal or reception in a given area in which a user device can have successfully access both for data and voice services (e.g., [ITU-T E.806]). | Theoretical calculation or Drive test | This parameter can estimate the geographic reach of a mobile UMTS network. |
| Accessibility | Circuit switch (CS) radio resource control (RRC) setup success rate | Describes the ratio of all successful RRC establishments to RRC establishment attempts (e.g., clause 7.2 of [ETSI TS 132 410]). | Real traffic or test traffic | Primary This KPI can indicate the signalling functions that configures the UE and control planes to allow other functions (e.g., calls, handover, etc.) and resource management to be implemented. This KPI can be used for troubleshooting and dimension purposes. It can be used to determine RNC or cell admission capacity or system load. |
| | Radio access bearer (RAB) establishment success rate for circuit switch (CS) | The ratio of successful conversational speech related RAB establishments to conversational speech related RAB establishment attempts (e.g., clause 7.1.1 of [ETSI TS 132 410]). | | Primary Can be used to evaluate speech service accessibility. This KPI can be used to determine planning and dimension, speech calls redirected to gsm, or calls unto the 3G network via incoming IRAT handover. |
| | Radio access bearer (RAB) establishment success rate for packet switch (PS) | Describes the ratio of all successful PS RAB establishments to PS related RAB establishment attempts (e.g., clause 7.1 of [ETSI TS 132 410]). | Real traffic | Primary Can be used to evaluate packet-based service accessibility. |

TABLE 2-continued

| | | Example KPIs for UMTS Network | | |
|---|---|---|---|---|
| Category | Key performance indicators (KPIs) | Definition | Measurement approach | Considerations |
| Retainability | Radio access bearer (RAB) abnormal release rate | Describes the ratio of number of RAB release requests to number of the successful RAB establishments (e.g., clause 8.1 of [ETSI TS 132 410]). | Real traffic or test traffic | Primary Any RAB abnormal release after RAB establishment and alerting can be considered a drop call. |
| | Soft handover success rate | Describes the ratio of number of successful radio link additions to the total number of radio link addition attempts (e.g., clause 9.1 of [ETSI TS 132 410]). | Real traffic or test traffic | Secondary Measures the simultaneous establishment of links to two base stations. It can indicate that this handover success is high because issues can result in a dropped call. |
| | Circuit switch (CS) inter radio access technology (RAT) handover success rate | Describes the ratio of number of successful inter RAT handover to the total number of the attempted inter RAT handover from UMTS to GSM for CS domain (e.g., clause 9.3 of [ETSI TS 132 410]). | Real traffic or test traffic | Secondary This KPI can be used to evaluate whether the capacity on the cell (i.e., on the GSM network) that the UE is trying to enter for CS may be insufficient or not. |
| | Packet switch (PS) inter RAT handover success rate | Describes the ratio of number of successful inter RAT handover to the total number of the attempted inter RAT handover from UMTS to GSM for PS domain (e.g., clause 9.4 of [ETSI TS 132 410]). | Real traffic or test traffic | Secondary This KPI can be used to evaluate whether the capacity on the cell (i.e., on the GSM network) that the UE is trying to enter for PS may be insufficient or not. |

TABLE 3

| | | Example KPIs for LTE Network | | |
|---|---|---|---|---|
| Category | Key performance indicators (KPIs) | Definition | Measurement approach | Considerations |
| Availability | Radio coverage-RSRP reference signal received power | Mobile coverage essentially represents the strength/power level of signal or reception in a given area in which an end user can have successfully access both for data and voice services (e.g., [ITU-T E.806]). | Theoretical calculation/ Drive test | This parameter is important for the estimation of the geographic reach of a mobile LTE network. |
| Accessibility | E-UTRAN radio access bearer (E-RAB) accessibility | Probability for an end-user to be provided with an E-RAB at request (e.g., clause 6.1.1 of [ETSI TS 132 450]). | Real traffic or test traffic | Primary It is a major KPI in LTE for measuring accessibility. For the purposes of optimisation, it helps understand the common failures that usually cause E-RAB setup failures. |

TABLE 3-continued

| | Example KPIs for LTE Network | | | |
|---|---|---|---|---|
| Category | Key performance indicators (KPIs) | Definition | Measurement approach | Considerations |
| Retainability | Evolved-UMTS terrestrial radio access network (E-UTRAN) Radio access bearer (E-RAB) abnormal release rate | A measurement that shows how often an end-user abnormally loses an E-RAB during the time the E-RAB is used (e.g., clause 6.2.1.2 of [ETSI TS 132 450]). | Real traffic or test traffic | Primary E-RAB is an important parameter in LTE KPI analysis. An E-RAB abnormal release means that an ongoing session is dropped requiring the user to initiate a new connection to resume the services. |
| Integrity | Latency | A measurement that shows how E-UTRAN impacts on the delay experienced by an end-user. Time from reception of IP packet to transmission of first packet over the air interface (e.g., clause 6.3.2 of [ETSI TS 132 450]). | Test traffic | Primary Latency impacts the network's throughput and thus the user's experience. The higher the latency, the higher the delays and the poorer the user's experience |

TABLE 4

| | Example KPIs for LTE Network |
|---|---|
| LTE KPI | Test Case |
| Accessibility | RRC Connection Establishment |
| | Random Access |
| | Initial E-RAB Establishment Success Rate |
| | RRC Connection Establishment Counters |
| | Initial E-RAB Establishment Success Rate Counters |
| | Added E-RAB Establishment Success Rate Counters |
| | Added E-RAB Establishment Success Rate |
| | S1 Signaling Connection Establishment |
| Retainability | MME Initiated E-RAB & UE Context Release with counters Description |
| | UE Session Time |
| | RBS Initiated E-RAB & UE Context Release with counters Description |
| | MME & RBS Initiated UE Context Release Flow Chart |
| | MME & RBS Initiated E-RAB Release Flow Chart |

TABLE 4-continued

| | Example KPIs for LTE Network |
|---|---|
| LTE KPI | Test Case |
| Integrity | E-UTRAN Throughput KPIs |
| | E-UTRAN Latency KPIs |
| | E-UTRAN Packet Loss KPIs |
| Mobility | X2 Based Handover Preparation & Execution |
| | Intra RBS Handover Preparation & Execution |
| | Intra Frequency Handover Preparation & Execution Counters |
| | S1 Based Handover Preparation & Execution |
| | Intra-frequency intra-LTE S1 & X2 Handover Flowchart |
| | Inter Frequency Handover Preparation & Execution Counters |
| | Inter-frequency intra-LTE S1 & X2 Handover Flowchart |
| Availability | Partial cell availability (node restarts excluded) |

TABLE 5

| Example KPIs for 5G Network | | |
|---|---|---|
| 5G performance requirement type | Minimum KPI requirement | category |
| Peak Data Rate | Downlink: 20 Gbps Uplink: 10 Gbps | eMBB |
| Peak Spectral Efficiency | Downlink: 30 bits/sec/Hz Uplink: 15 bits/sec/Hz | eMBB |
| Data rate experienced by User | Downlink: 100 Mbps Uplink: 50 Mbps | eMBB |
| Area Traffic Capacity | Downlink: 10 Mbits/sec/m$^2$ in indoor hotspot (eMBB test environment) | eMBB |
| Latency (User Plane) | 4 ms for eMBB 1 ms for URLLC | eMBB, URLLC |
| Latency (User Plane) | 20 ms (10 ms encouraged) | eMBB, URLLC |

TABLE 5-continued

Example KPIs for 5G Network

| 5G performance requirement type | Minimum KPI requirement | category |
|---|---|---|
| Connection Density | $1 \times 10^6$ devices/Km$^2$ | mMTC |
| Average Spectral Efficiency | (All the below figures are in units of bits/sec/Hz/TRxP) Indoor hotspot: DL:9/UL 6.75 Dense Urban:DL:7.8/UL:5.4 Rural: DL: 3.3/UL:1.6 | eMBB |
| Energy Efficiency | Efficient data transmission (Loaded case): To be demonstrated by "average spectral efficiency". Low energy consumption (no data case): This test case should support high sleep ratio/long sleep duration. | eMBB |
| Reliability | $1 \times 10^{-5}$ probability of transmitting layer-2 Power Distribution Unit (PDU) of 32 bytes in size within 1 ms (in channel quality of coverage edge for Urban Macro-URLLC test environment.) | URLLC |
| Mobility | Dense Urban: up to 30 Km/h Rural: up to 500 Km/h | eMBB |
| Mobility Interruption Time | 0 ms | eMBB, URLLC |
| Bandwidth (Maximum Aggregated System) | At least 100 MHZ Up to 1 GHz for operation in high frequency bands i.e. above 6 GHz | IMT-2020 |

The multi-network management system 130 can receive one or more of the example KPIs in the tables above, or one or more combinations of these example KPIs. Additionally, the multi-network management system 130 can process each KPI received (e.g., via a network interface) using one or more processors via computer storage media having computer-executable instructions embodied thereon. In some embodiments, at least one KPI for each RAN node is received in real-time.

In some embodiments, the multi-network management system 130 can transmit interface self-configuration and optimization. In some embodiments, the multi-network management system 130 can shift one or more operations or one or more loads between network domains corresponding to the network managers 116A-116C and based on receiving the network performance data (e.g., one or more KPI types) from each of the network managers 116A-116C. For example, the multi-network management system 130 can allocate various resources or resource usages corresponding to the plurality of RAN nodes within a plurality of coverage areas. In some embodiments, the multi-network management system 130 can be integrated with operations support systems or customer experience management tools corresponding to each of the network managers 116A-116C. In some embodiments, the multi-network management system 130 can connect to one or more transport provisioning tools (e.g., a software defined networking controller) of the network managers 116A-116C via a standard measurement and configuration interface or can act as a user of one or more of the transport provisioning tools.

In some embodiments, each of network managers 116A-116C are above a threshold distance from each other. In some embodiments, one or more of the network managers 116A-116C include self-organizing network technology that can apply true plug-and-play, self-configuration, and self-optimization. In some embodiments, one or more of the network managers 116A-116C are deployed at an eNB, a signaling gateway, or a system architecture evolution gateway. For example, the network manager 116A can be a software entity running on the eNB or attached to the eNB as a site device. As another example, the network manager 116A can configure transport connectivity of base station 114A and base station 114B. In some embodiments, the network managers 116A-116C can extract real-time quality of experience and QoS measurements (e.g., one or more KPIs) from control plane traffic of the base station 114A and 114B. In some embodiments, one or more of the network managers 116A-116C can implement a closed control loop.

In embodiments, the multi-network management system 130 can receive network performance data (e.g., from network managers 116A-116C) corresponding to one or more of user devices 102A-102D, the base stations 114A-114F, satellites 120A-120B, another network component (e.g., an MME), or one or more combinations thereof. As one example, the network performance data can correspond to communications between user device 102D and base station 114D over coverage area 110D. As another example, the network performance data can correspond to communications between user device 102B and one or more of base stations 114E and 114F (or a handover between base stations 114E and 114F) over coverage area 110E. As another example, the network performance data can correspond to communications between user device 102C and one or more of base stations 114A and 114B (or a handover between base stations 114A and 114B) over coverage areas 110B or 110C. In another example, the network performance data can correspond to communications between user device 102C and satellite 120A, or a handover between satellite 120A and base station 114B.

In yet another example, the network performance data can correspond to an enhanced broadband communication, an ultra-reliable communication, a low latency communication, another type of communication, or one or more combinations thereof, within one or more portions of coverage area 110A. In some embodiments, the network performance data can correspond to a License Assisted Access communication, an LTE-Unlicensed radio access technology communication, an unlicensed band communication, a carrier sensing operation for collision avoidance and detection, a downlink transmission, an uplink transmission, a P2P transmission, a D2D transmission, another type of unlicensed spectrum operation, an FD-MIMO communication, a massive MIMO communication, an MU-MIMO communication, a cooperative MIMO communication, a 4G communication, a 5G communication, another generation communication, another type of communication, or one or more combinations thereof. In some embodiments, the network performance data can correspond to ultra-reliable communications, low-latency communications, mission critical communications, ultra-reliable low-latency communications, RAN node ultra-reliable functions, RAN node low-latency functions, RAN node critical functions, mission critical push-to-talk functions, mission critical imaging functions, another type of coverage area 110A device communication or function, or one or more combinations thereof.

In embodiments, one or more of the user devices 102A-102D, the base stations 114A-114F, satellites 120A-120B, the multi-network management system 130, another network component (e.g., an MME), or one or more combinations thereof, may have one or processors capable of processing network performance data (e.g., KPIs), user device location data, weather data (e.g., humidity data, ultraviolet data, temperature data), ultra-reliable data, low-latency data, critical data, other types of data, or one or more combinations thereof. In some embodiments, the multi-network management system 130 has one or more processors, which may include one or more of a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, a processor unit of the multi-network management system 130 may be located in a single integrated circuit component (e.g., multi-chip module) or in separate integrated circuit components.

In embodiments, the one or more processors of the multi-network management system 130 can determine a capacity for each of the plurality of network managers based on the at least one KPI received for a RAN node (e.g., base station 114A, satellite 120A, another network component of coverage area 110A, an antenna element or antenna array of base station 114C, an antenna element or antenna array of satellite 120B). In one non-limiting example, the one or more processors of multi-network management system 130 can analyze network performance data received in real-time, wherein the network performance data includes a first set of KPIs received during a first predetermined time range at a first predetermined rate, and wherein the KPIs correspond to one or more downlinks from base station 114C to user device 102C. Continuing this example, the KPIs can include measurements of the downlink by user device 102C (e.g., SINR). Additionally or alternatively, the KPIs can correspond to antenna elements of the base station 114C (e.g., antenna tilt and antenna angle).

In embodiments, the multi-network management system 130 can cause the display, via a user interface (e.g., of a user device 102A-102D or another user device in communication with or part of the multi-network management system 130), a dashboard comprising a capacity icon for the capacity determined for each of the plurality of network managers. The capacity icon for each of the plurality of network managers can displayed on the dashboard based on an identifier for each of the plurality of network managers (e.g., a network manager location identifier, a RAN node identifier for each of the RAN nodes in communication with a network manager, another type of network manager identifier). In an embodiment, the multi-network management system 130 can identify a first network manager having a first plurality of RAN nodes managed by the first network manager and a second network manager having a second plurality of RAN nodes managed by the second network manager. Based on identifying the first network manager and the second network manager, the multi-network management system 130 can determine that a first capacity of the first network manager is above a first threshold and that a second capacity for the second network manager is below a second threshold, wherein the first threshold corresponds to the first plurality of RAN nodes and the second threshold corresponds to the second plurality of RAN nodes. Based on these determinations, the multi-network management system 130 can provide an indication on the dashboard for resource reallocation from the first network manager to the second network manager. In an aspect, the resource reallocation corresponds to a rate at which the first network manager receives at least one KPI for a first RAN node in communication with the first network manager and a rate at which the second network manager receives at least one KPI for a second RAN node in communication with the second network manager.

In some embodiments, the multi-network management system 130 can collect, retrieve, parse, or extract the network performance data from one or more of the network managers 116A, 116B and 116C (e.g., the multi-network management system 130 can collect, retrieve, parse, or extract JSON files), transmit the network performance data (e.g., the JSON files) to one or more servers associated with the multi-network management system 130. For example, the multi-network management system 130 can interpret the network performance data, apply a uniform formatting to the network performance data from each of the network managers 116A, 116B and 116C, and create scripts using the network performance data. In addition, the multi-network management system 130 can save the interpretations, formatting, scripts, other operations, or one or more combinations thereof to one or more databases (e.g., a MariaDB) associated with the multi-network management system and also display these in the dashboard (e.g., a Grafana dashboard).

Figure 2:
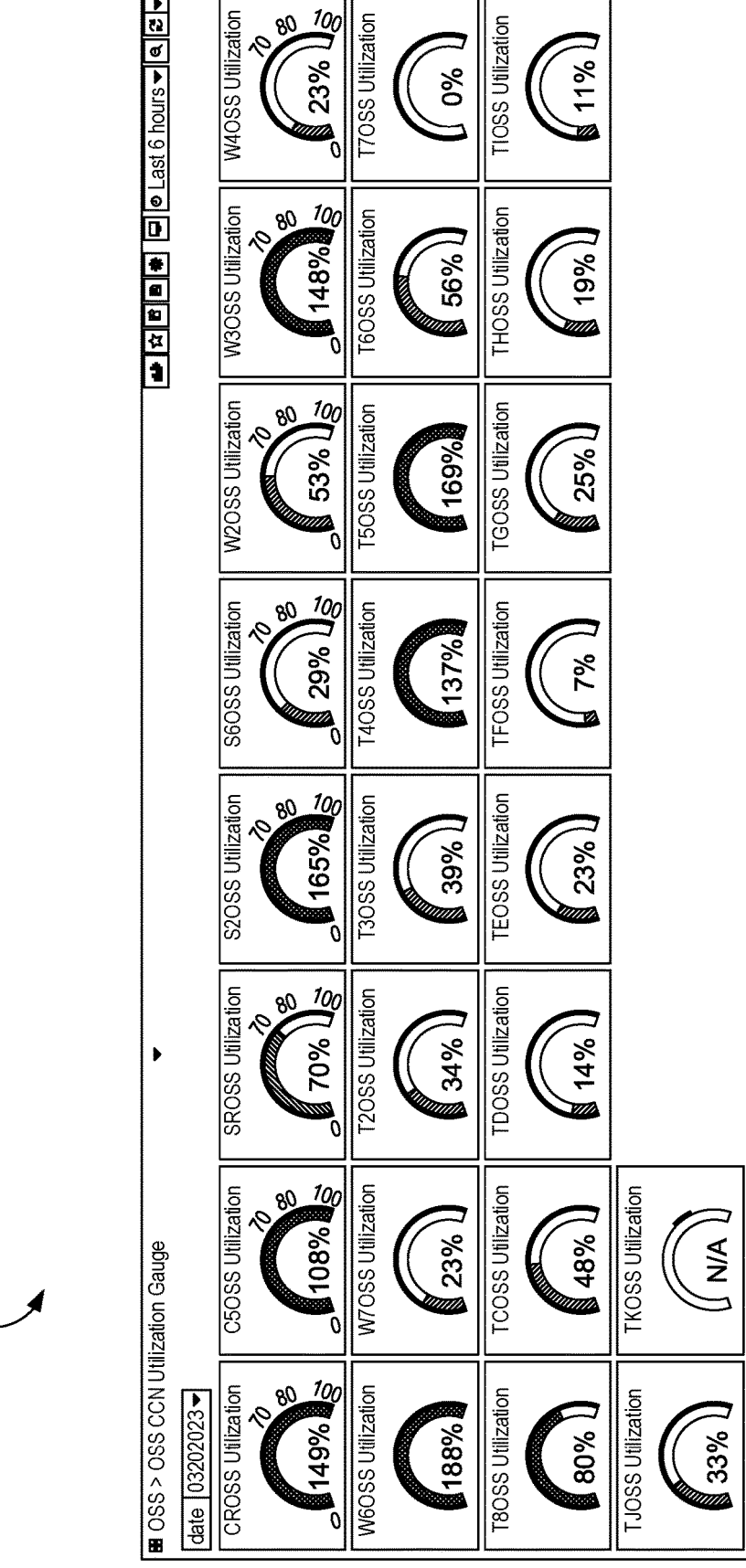

FIG. 2 provides example capacity dashboard 200 provided by multi-network management system (e.g., the multi-network management system 130 of FIG. 1), in accordance with one or more embodiments disclosed herein. Example capacity dashboard 200 is but one example of a capacity dashboard and is not intended to suggest a particular limitation as to the scope of use or functionality of the invention. Neither should the capacity dashboard 200 be interpreted as having any particular dependency or requirement relating to any one or combination of components illustrated. For example, in some embodiments, the example capacity dashboard 200 can include capacity icons not depicted.

Example capacity dashboard 200 includes a plurality of capacity icons determined using one or more KPIs corresponding to Configuration Change Notification (CCN) utilization in %, each of the capacity icons being associated with a network manager (e.g., network manager 116A of FIG. 1). A first capacity icon "CROSS" (a "CR" Operations Support System, wherein CR corresponds to a first network manager) depicts a first capacity utilization of a first network manager. For example, the first capacity icon provides an indication of the first utilization of the first network manager having 149% capacity. In addition, the first capacity icon is visually different from a second capacity icon "SROSS" (a "SR" Operations Support System, wherein SR corresponds to a second network manager), since the first capacity is higher than the second capacity for the second capacity icon, which provides an indication of the second utilization of the second network manager having 70% capacity utilization. The first capacity icon in this example does not have available capacity, and the second capacity icon has 30% available capacity remaining.

In some embodiments, one or more thresholds can be determined for each capacity icon for each network manager. For example, in some embodiments, the threshold is 80% utilization with 20% or less available capacity. In some embodiments, a second threshold may be 100%. In some embodiments, the dashboard can automatically update capacity icons as the multi-network management system continuously receives KPIs from RAN nodes for each network manager. For example, "T3OSS" capacity icon can increase or decrease from the illustrated 39% as KPIs are being received. As such, the dashboard can provide an alert for capacity icons that have capacity utilization increasing at a rate above a predetermined threshold rate. In some embodiments, the dashboard can provide an alert for capacity icons that have capacity availability decreasing at a rate above a predetermined threshold rate. In some embodiments, the dashboard can provide notifications for capacity icons that have capacity availability that is increasing at a predetermined rate.

FIG. 3 provides example capacity dashboard 300 provided by multi-network management system (e.g., the multi-network management system 130 of FIG. 1), in accordance with one or more embodiments disclosed herein. Example capacity dashboard 300 is but one example of a capacity dashboard and is not intended to suggest a particular limitation as to the scope of use or functionality of the invention. Neither should the capacity dashboard 300 be interpreted as having any particular dependency or requirement relating to any one or combination of components illustrated. For example, in some embodiments, the example capacity dashboard 300 can include capacity icons not depicted.

Example capacity dashboard 300 includes a plurality of capacity icons determined using one or more KPIs corresponding to Millions Counters Per Hour (MCPH) Utilization in %, each of the capacity icons being associated with a network manager (e.g., network manager 116A of FIG. 1). A first capacity icon "CROSS" (a "CR" Operations Support System, wherein CR corresponds to a first network manager) depicts a first capacity utilization of a first network manager. For example, the first capacity icon provides an indication of the first utilization of the first network manager having 165% capacity. In addition, the first capacity icon is visually different from a second capacity icon "SROSS" (a "SR" Operations Support System, wherein SR corresponds to a second network manager), since the first capacity is higher than the second capacity for the second capacity icon, which provides an indication of the second utilization of the second network manager having 66% capacity utilization. The first capacity icon in this example does not have available capacity, and the second capacity icon has 24% available capacity remaining.

The capacity icon for each of the plurality of network managers is displayed on the dashboard based on at least one identifier for each of the plurality of network managers. For example, the identifiers in this example include "CR," "C5," "SR," etc., and the example capacity dashboard 300 has displayed the capacity icons based on at least this identifier for each of the plurality of network managers (e.g., alphabetically by identifier). In some embodiments, "CR" corresponds to a location of the network manager. In other embodiments, the capacity icons can be displayed on the dashboard in an ascending order from a highest capacity utilization to a lowest capacity utilization, or in a descending order from a lowest capacity utilization (e.g., the "TKOSS" capacity icon) to the highest capacity utilization (e.g., the "CROSS" capacity icon). In some embodiments, each capacity icon can correspond to each RAN node that is in communication with each network manager.

Figure 4:
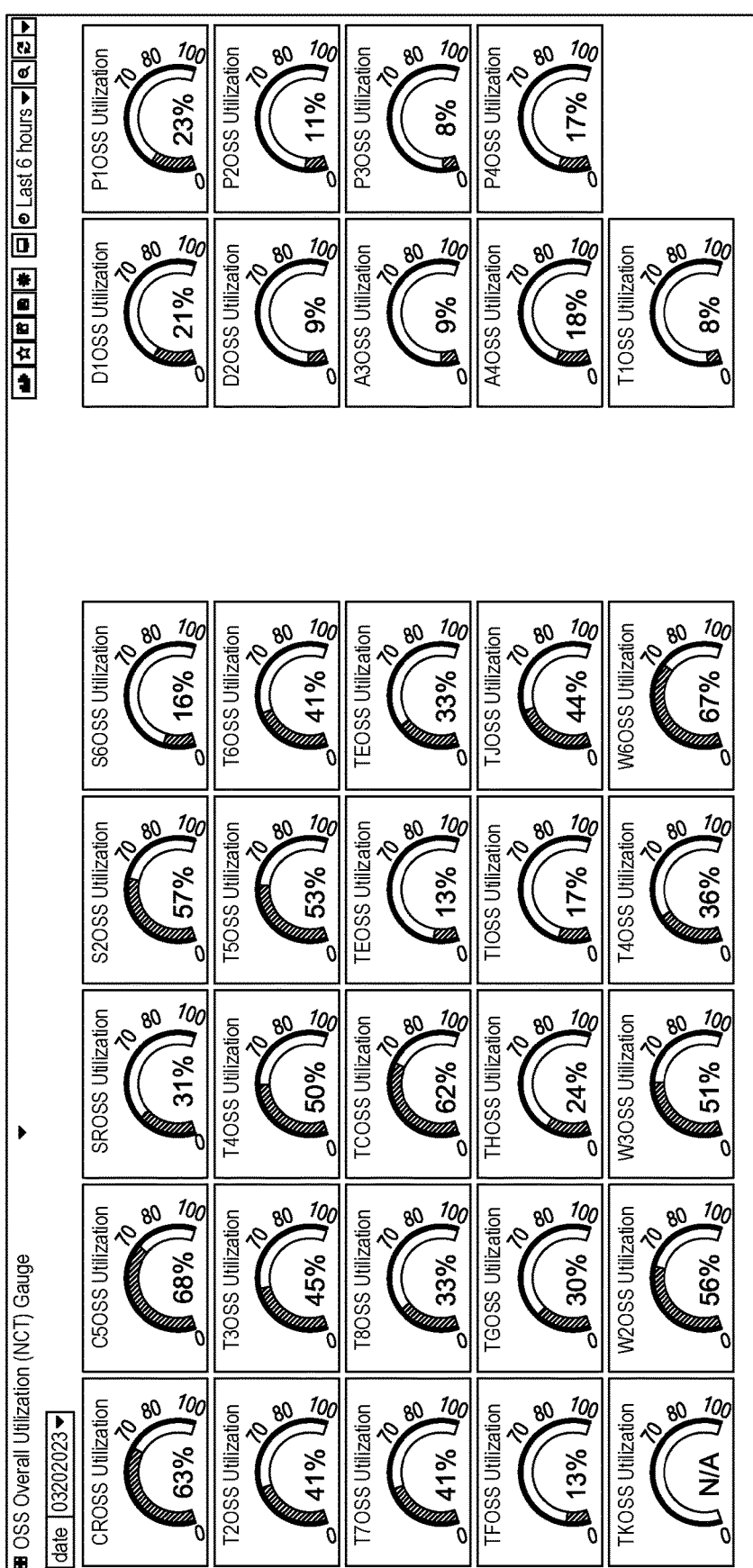

FIG. 4 provides example overall capacity dashboard 400 provided by multi-network management system (e.g., the multi-network management system 130 of FIG. 1), in accordance with one or more embodiments disclosed herein. Example capacity dashboard 400 is but one example of a capacity dashboard and is not intended to suggest a particular limitation as to the scope of use or functionality of the invention. Neither should the capacity dashboard 400 be interpreted as having any particular dependency or requirement relating to any one or combination of components illustrated. For example, in some embodiments, the example capacity dashboard 400 can include capacity icons not depicted.

Example capacity dashboard 400 includes a plurality of capacity icons determined using one or more KPIs corresponding to OSS Overall Capacity Utilization in %, each of the capacity icons being associated with a network manager (e.g., network manager 116A of FIG. 1). A first capacity icon "CROSS" (a "CR" Operations Support System, wherein CR corresponds to a first network manager) depicts a first capacity utilization of a first network manager. For example, the first capacity icon provides an indication of the first utilization of the first network manager having 63% capacity. In addition, the first capacity icon is visually different from a second capacity icon "TKOSS" (a "TK" Operations Support System, wherein TK corresponds to a second network manager), since the first capacity is higher than the second capacity for the second capacity icon, which provides an indication of the second utilization of the second network manager having 0% capacity utilization. The first capacity icon in this example has 27% available capacity, and the second capacity icon has 100% available capacity remaining. In this example embodiment of the capacity dashboard, example capacity dashboard 400 does not have any capacity icons at 100% capacity utilization, and each of the capacity icons depict capacity availability associated with each corresponding network manager.

Example capacity dashboard 500 depicted in FIG. 5 includes network manager identifiers (e.g., "cross," "c5oss," "sross," "s2oss," etc.), numeric network manager identifiers (e.g., 1611, 16112, 16113, 16114, etc.), network manager size indicators (e.g., XXL+, 3XL+100K, etc.), as well as other network cell capacity data. In some embodiments, the capacity dashboard 500 provides each of the capacity rows based on a particular technology. In some embodiments, the one or more KPIs used to generate example capacity dashboard 500 may include one or more of TRX/2G Cell, TRX/2G Normalized Cell, WCDMA/3G Cell, WCDMA/3G Normalized Cell, LTE Cell, NRCEL/5G Cell, NBIOT Cell, Normalized Total Cell, Normalized Cell Capacity, Normalized Cell Total Utilization in %, another KPI, or one or more combinations thereof.

Figure 6:

Additionally, FIG. 6 provides example capacity dashboard 600 having capacity rows that are displayed based on a particular identifier (e.g., alphabetically based on network manager identifiers (e.g., "cross," "c5oss," "sross," "s2oss," etc.)). In some embodiments, the one or more KPIs used to generate example capacity dashboard 600 may include one or more of BSC object count, BTS object count, RNC object count, WBTS object count, LNBTS object count, Nrbts object count, Total object count, another KPI, or one or more combinations thereof. In addition, FIG. 7 provides example capacity dashboard 700 having capacity rows that are displayed based on a particular identifier (e.g., alphabetically based on network manager identifiers (e.g., "cross," "c5oss," "s5oss," "s2oss," etc.)). Further, example capacity dashboard 700 displays normalized total utilizations, which can be determined by the multi-network management system. Example capacity dashboard 700 also displays a plurality of thresholds (e.g., a normalized cap, a CCN event cap, etc.), which can be determined by the multi-network management system. In some embodiments, the one or more KPIs used to generate example capacity dashboard 700 may include one or more of NetAct Utilization, Normalized Cell Total, Normalized Capacity, Normalized Total Utilization, CCN Event Per Min, CCN Event per Min Capacity, CCN Event per Min Utilization, MCPH, MCPH Capacity, MCPH Utilization, FM Event per Second, FM Event per Second Capacity, FM Event per Second Utilization, another KPI, or one or more combinations thereof. Furthermore, example capacity dashboard 800 of FIG. 8 displays a plurality of capacity rows that are displayed based on numeric network manager identifiers (e.g., 408, 409, 410, 411, etc.). In some embodiments, the one or more KPIs used to generate example capacity dashboard 800 may include one or more of NetAct Utilization, MCPH, MCPH Capacity, MCPH Utilization, PM file count, PM file capacity, PM file utilization, CCN Event Per Min, CCN Event per Min Capacity, CCN Event per Min Utilization, FM Event per Second, FM Event per Second Capacity, FM Event per Second Utilization, another KPI, or one or more combinations thereof.

Figure 10:
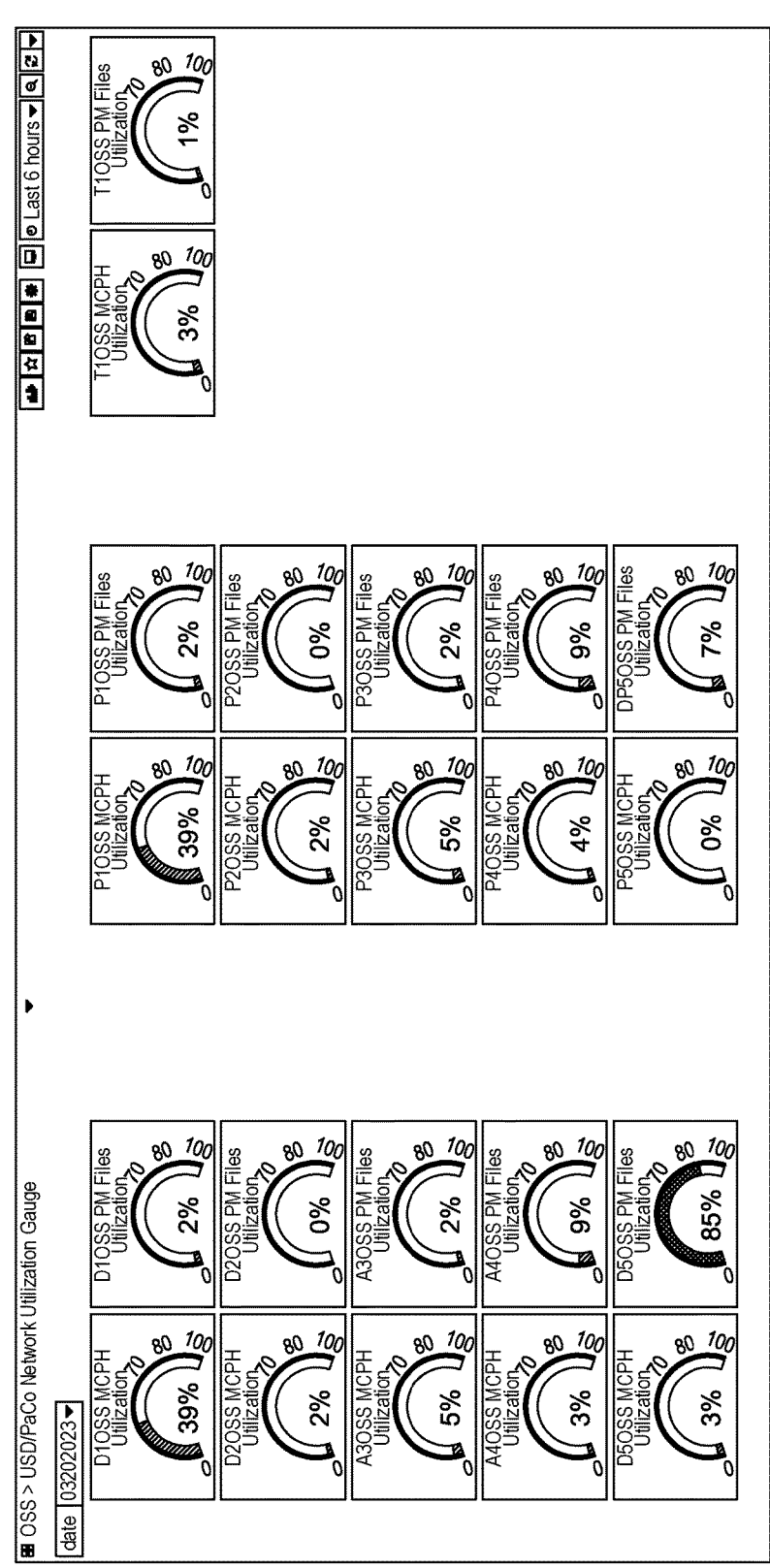

FIG. 9 illustrates example capacity dashboard 900 and FIG. 10 provides example capacity dashboard 1000. In some embodiments, the one or more KPIs used to generate example capacity dashboard 900 may include one or more of RAN Normalized Network Utilization, another KPI, or one or more combinations thereof. In some embodiments, the one or more KPIs used to generate example capacity dashboard 1000 may include one or more of USD/PaCo Normalized Network Utilization, another KPI, or one or more combinations thereof. In embodiments, example capacity dashboard 1000 displays a first capacity icon having a highest capacity utilization (e.g., D5OSS PM Files Utilization icon having 85% capacity utilization) and a plurality of capacity icons having the lowest capacity utilization (e.g., D2OSS PM Files Utilization having 0% capacity utilization, P2OSS PM Files Utilization having 0% capacity utilization, etc.). The D5OSS MCPH Utilization icon having 3% capacity utilization is visually different from the D5OSS PM Files Utilization Icon, wherein the 3% capacity utilization is displayed having a different pattern from the 85% capacity utilization having a pattern that is more visually prominent. In some embodiments, the example capacity dashboard 1000 provides an alert for the D5OSS PM Files Utilization icon having 85% capacity utilization, which may be above a first threshold. In some embodiments, the example capacity dashboard 1000 provides another type of notification for when the capacity utilization moves below the threshold based on KPIs from a corresponding RAN node.

Example Flowchart

Having described the example embodiments discussed above, an example flowchart is described below with respect to FIG. 11. Example flowchart 1100 begins at Step 1102 with establishing a connection, via a multi-network management system, with a plurality of network managers, wherein each of the plurality of network managers are in communication with one or more RAN nodes. In some embodiments, the multi-network management system is connected with the plurality of network managers over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

Step 1104 includes receiving network performance data (e.g., at least one KPI) for each of the plurality of RAN nodes that are in connection with one or more network managers. In some embodiments, the multi-network management system receives a first set of KPIs from a first RAN node corresponding to a first network manager, a second set of network performance data from a second RAN node corresponding to a second network manager, a third set of network performance data from a third RAN node corresponding to the second network manager, a fourth set of network performance data from a fourth RAN node corresponding to the second network manager, a fifth set of network performance data from a fifth RAN node corresponding to a third network manager, and a sixth set of network performance data from a sixth RAN node corresponding to a fourth network manager. In one aspect, the first RAN node and the second RAN node are different types of RAN nodes. In some embodiments, the fourth RAN node and the fifth RAN node implement different generation communication systems. In some embodiments, the first network manager and the second network manager have one or more different network manager components. In some embodiments, the first node and the third node are above a threshold distance from each other. In some embodiments, the first network manager and the second network manager are above a threshold distance from each other.

In some embodiments, the multi-network management system receives historical KPIs for each of the RAN nodes in communication with each of the plurality of network managers. In some embodiments, each of the KPIs or each of the historical KPIs correspond to RAN node capabilities or RAN node operating configurations of the respective RAN node. In some embodiments, one or more KPIs are received in real-time. In some embodiments, one or more KPIs correspond to one or more of the following categories: accessibility, retainability, integrity, mobility, availability, another type of category, or one or more combinations thereof. In some embodiments, one or more KPIs correspond to a peak data rate for a downlink associated with a RAN node, a peak data rate for an uplink associated with a RAN node, a peak spectral efficiency corresponding to a downlink, a peak spectral efficiency corresponding to an uplink, an area traffic capacity associated with an indoor hotspot and a downlink from a RAN node to a 5G communication component (e.g., an eMBB), a connection density, or another type of KPI.

At Step 1106, a capacity is determined for each network manager in communication with the multi-network management system. In some embodiments, the capacity is determined based on one or more KPIs received for each of the plurality of RAN nodes in communication with a particular network manager. In some embodiments, the capacity for each network manager is determined based on identifying a network manager for each RAN node in communication with the network manager. In some embodiments, a first capacity is determined for a first network manager having the highest capacity utilization and a second capacity is determined for a second network manager having the lowest capacity utilization. In some embodiments, one or more capacities for one or more network managers are updated based on receiving additional KPIs. In some embodiments, a total capacity associated with each of the network managers in communication with the multi-network management system is determined.

Step 1108 includes displaying, via a user interface, a dashboard comprising a capacity icon for the capacity determined for each of the plurality of network managers, wherein the capacity icon for each of the plurality of network managers is displayed on the dashboard based on at least one identifier for each of the plurality of network managers. In some embodiments, a capacity icon for each of the plurality of network managers is displayed on the dashboard in an ascending order from a highest capacity utilization to a lowest capacity utilization. In some embodiments, the capacity icon for each of the plurality of network managers is displayed on the dashboard in a descending order from a lowest capacity utilization to a highest capacity utilization. In some embodiments, the capacity icon for the highest capacity utilization is visually different from the capacity icon for the lowest capacity utilization.

Step 1110 includes determining a first capacity for a first network manager of the plurality of network managers is above a threshold. In some embodiments, a threshold for one or more of each network managers is determined based on historical KPIs associated with one or more RAN nodes in communication with a network manager. In some embodiments, the threshold is determined based on RAN node capabilities and RAN node operating configurations for each RAN node in communication with the network manager. Based on this, the dashboard can be updated at Step 1112. For example, an alert can be provided for the first capacity on the dashboard. Additionally, a second capacity can be determined for a second network manager of the plurality of network managers, the second capacity being within a predetermined range that is approaching the threshold. Based on this, an indication for the second capacity can be provided on the dashboard. In some embodiments, a threshold for each of the plurality of network managers can be determined based on historical KPIs of each of the plurality of network managers and based on RAN node capabilities and RAN node operating configurations for each of the plurality of RAN nodes that correspond to each network manager of the plurality of network managers. Based on this, the capacity for each of the plurality of network managers can be determined.

In some embodiments, a first capacity for a first network manager and a second capacity for a second network manager is determined to be above a threshold. Based on this, an alert for the first capacity and the second capacity can be provided on the dashboard. In some embodiments, a first network manager of the plurality of network managers is identified, wherein the first network manager corresponds to the highest capacity utilization and a second network manager of the plurality of network managers is identified that corresponds to the lowest capacity utilization. Based on this, it is determined that a first capacity of the first network manager is above a threshold and that a second capacity for the second network manager is below the threshold. Based on this, an indication for resource reallocation from the first network manager to the second network manager is provided. In embodiments, the resource allocation corresponds to a rate at which the first network manager receives the at least one KPI for each RAN node of the first network manager and a rate at which the second network manager receives the at least one KPI for each RAN node of the second network manager.

In some embodiments, based on identifying a first network manager and a second network manager, it is determined that a first capacity of the first network manager is above a first threshold and that a second capacity for the second network manager is below a second threshold, the first threshold corresponding to the plurality of RAN nodes managed by the first network manager, the second threshold corresponding to the plurality of RAN nodes managed by the second network manager. Based on this, an indication is provided on the dashboard for resource reallocation from the first network manager to the second network manager. In some embodiments, a third network manager of the plurality of network managers is identified. Based on this, it is determined that a third capacity of the third network manager is below a third threshold, the third threshold corresponding to the plurality of RAN nodes managed by the third network manager. Based on this, an indication on the dashboard for resource reallocation from the first network manager to the third network manager is provided. In embodiments, the resource allocation corresponds to increasing a rate at which the first network manager receives the at least one KPI for each RAN node of the first network manager and decreasing the rate at which the second network manager and the third network manager receive the at least one KPI for each RAN node.

In some embodiments, it is determined that the second capacity of the second network manager is closer to the second threshold for the second network manager than the third capacity for the third network manager is to the third threshold. Based on this, the multi-network management system can cause the rate at which the third network manager receives the at least one KPI for each RAN node to decrease to a lower rate than the rate for the second network manager. In some embodiments, it is determined that a fourth capacity corresponding to a fourth network manager is closer to a fourth threshold than the third capacity is to the third threshold. Based on this, the multi-network management system can cause the rate at which the third network manager receives the at least one KPI for each RAN node to decrease to a lower rate than the rate for the fourth network manager.

Example User Device

Having described the example embodiments discussed above of the presently disclosed technology, an example operating environment of an example user device (e.g., user device 102A of FIG. 1) is described below with respect to FIG. 12. User device 1200 is but one example of a suitable computing environment, and is not intended to suggest any particular limitation as to the scope of use or functionality of the technology disclosed. Neither should user device 1200 be interpreted as having any dependency or requirement relating to any particular component illustrated, or a particular combination of the components illustrated in FIG. 12.

Figure 12:
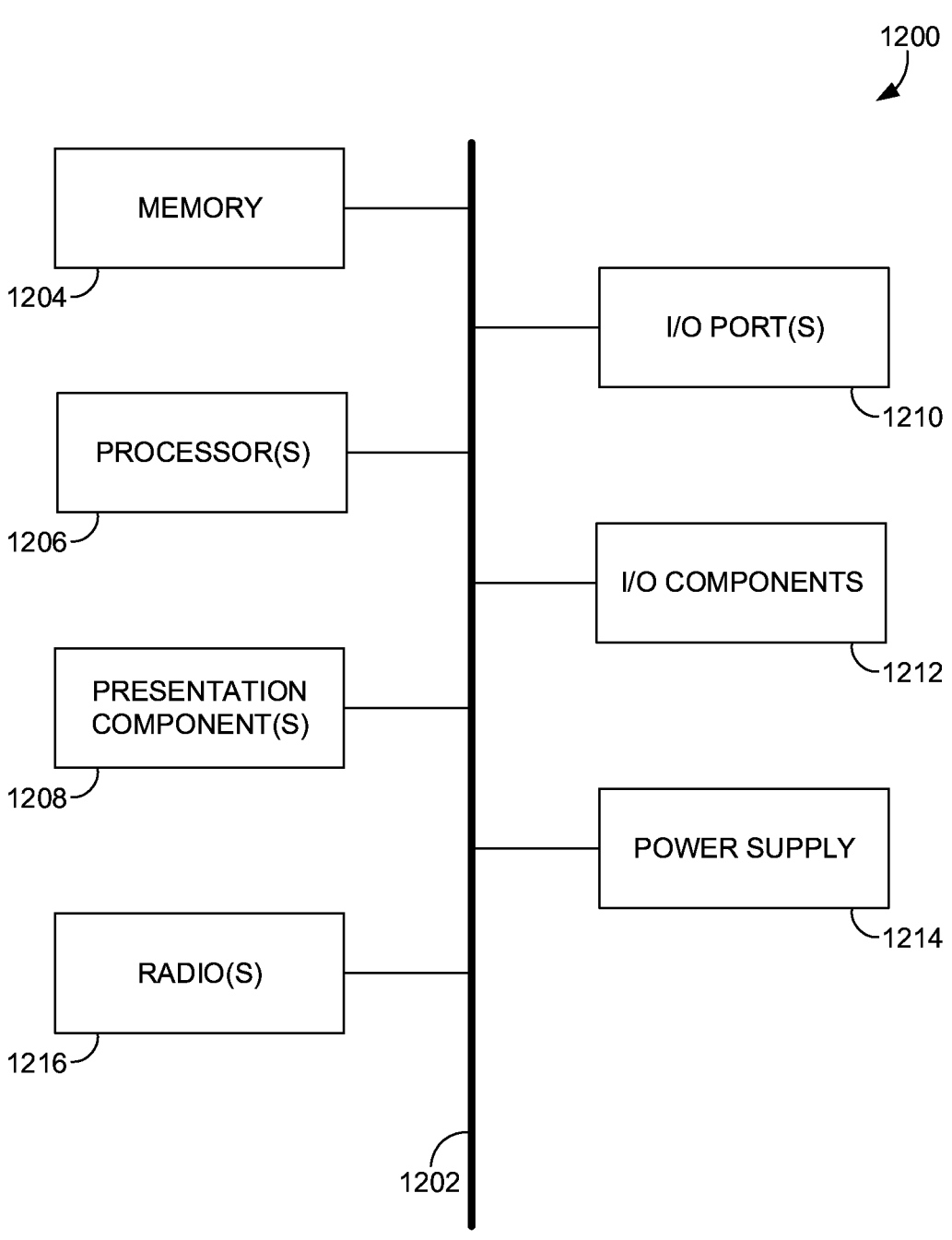
FIG. 12 depicts an example user device suitable for use in implementations of the present disclosure, in accordance with aspects herein.

As illustrated in FIG. 12, example user device 1200 includes a bus 1202 that directly or indirectly couples the following devices: memory 1204, one or more processors 1206, one or more presentation components 1208, one or more input/output (I/O) ports 1210, one or more I/O components 1212, a power supply 1214, and one or more radios 1216.

Bus 1202 represents what may be one or more busses (such as an address bus, data bus, or combination thereof). Although the various blocks of FIG. 12 are shown with lines for the sake of clarity, in reality, these blocks represent logical, not necessarily actual, components. For example, one may consider a presentation component, such as a display device, to be an I/O component. Also, processors have memory. Accordingly, FIG. 12 is merely illustrative of an exemplary user device that can be used in connection with one or more embodiments of the technology disclosed herein.

User device 1200 can include a variety of computer-readable media. Computer-readable media can be any available media that can be accessed by user device 1200 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 1204 includes computer storage media in the form of volatile and/or nonvolatile memory. The memory 1204 may be removable, non-removable, or a combination thereof. Example hardware devices of memory 1204 may include solid-state memory, hard drives, optical-disc drives, other hardware, or one or more combinations thereof. As indicated above, the computer storage media of the memory 1204 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 1200, or one or more combinations thereof.

The one or more processors 1206 of user device 1200 can read data from various entities, such as the memory 1204 or the I/O component(s) 1212. The one or more processors 1206 may include, for example, one or more microprocessors, one or more CPUs, a digital signal processor, one or more cores, a host processor, a controller, a chip, a micro-chip, one or more circuits, a logic unit, an integrated circuit (IC), an application-specific IC (ASIC), any other suitable multi-purpose or specific processor or controller, or one or more combinations thereof. In addition, the one or more processors 1206 can execute instructions, for example, of an operating system of the user device 1200 or of one or more suitable applications.

The one or more presentation components 1208 can present data indications via user device 1200, another user device, or a combination thereof. Example presentation components 1208 may include a display device, speaker, printing component, vibrating component, another type of presentation component, or one or more combinations thereof. In some embodiments, the one or more presentation components 1208 may comprise one or more applications or services on a user device, across a plurality of user devices, or in the cloud. The one or more presentation components 1208 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 1210 allow user device 1200 to be logically coupled to other devices, including the one or more I/O components 1212, some of which may be built in. Example I/O components 1212 can include a microphone, joystick, game pad, satellite dish, scanner, printer, wireless device, and the like. The one or more I/O components 1212 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 1208 on the user device 1200. In some embodiments, the user device 1200 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 1200 may, additionally or alternatively, be equipped with accelerometers or gyroscopes that enable detection of motion. In some embodiments, the output of the accelerometers or gyroscopes may be provided to the one or more presentation components 1208 of the user device 1200 to render immersive augmented reality or virtual reality.

The power supply 1214 of user device 1200 may be implemented as one or more batteries or another power source for providing power to components of the user device 1200. In embodiments, the power supply 1214 can include an external power supply, such as an AC adapter or a powered docking cradle that supplements or recharges the one or more batteries. In aspects, the external power supply can override one or more batteries or another type of power source located within the user device 1200.

Some embodiments of user device 1200 may include one or more radios 1216 (or similar wireless communication components). The one or more radios 1216 can transmit, receive, or both transmit and receive signals for wireless communications. In embodiments, the user device 1200 may be a wireless terminal adapted to receive communications and media over various wireless networks. User device 1200 may communicate using the one or more radios 1216 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 1216 may facilitate communication via radio frequency signals, frames, blocks, transmission streams, packets, messages, data items, data, another type of wireless communication, or one or more combinations thereof. The one or more radios 1216 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for a capacity management dashboard, the system comprising:
   a plurality of radio access network (RAN) nodes;
   a plurality of network managers that are each in communication with one or more of the plurality of RAN nodes; and
   a multi-network management system capable of communicating with the plurality of network managers for capacity management of the plurality of RAN nodes based on key performance indicators (KPIs), the multi-network management system configured to perform operations comprising:
   receiving at least one KPI for each of the plurality of RAN nodes;
   identifying a network manager of the plurality of network managers for each of the plurality of RAN nodes;
   determining a capacity for each of the plurality of network managers based on the at least one KPI received for each of the plurality of RAN nodes;
   providing an indication of the determined capacity for each of the plurality of network managers;
   determining a first capacity for a first network manager of the plurality of network managers is increasing at a rate above a predetermined threshold rate; and
   providing an alert for the first capacity based on determining the first capacity is increasing at the rate above the predetermined threshold rate.

2. The system according to claim 1, wherein the capacity for each of the plurality of network managers is determined based on the at least one KPI received for each of the plurality of RAN nodes, wherein indication of the determined capacity for each of the plurality of network managers is displayed based on at least one identifier for each of the plurality of network managers, and wherein the operations further comprise:
   determining a first capacity for a first network manager of the plurality of network managers is above a threshold; and
   providing an alert for the first capacity based on determining the first capacity for the first network manager is above the threshold.

3. The system according to claim 2, wherein the operations further comprise:
   determining a second capacity for a second network manager of the plurality of network managers is within a predetermined range that is approaching the threshold; and
   providing an indication for the second capacity based on determining the second capacity for the second network manager is within the predetermined range.

4. The system according to claim 1, wherein the operations further comprise:

determining a threshold for each of the plurality of network managers based on historical KPIs of each of the plurality of network managers and based on RAN node capabilities and RAN node operating configurations for each of the plurality of RAN nodes that correspond to each network manager of the plurality of network managers; and determining the capacity for each of the plurality of network managers based on the determined threshold.

5. The system according to claim 1, wherein the multi-network management system is in communication with over forty of the plurality of network managers.

6. The system according to claim 1, wherein the indication of the determined capacity for each of the plurality of network managers is displayed in an ascending order from a highest capacity utilization to a lowest capacity utilization.

7. The system according to claim 6, wherein the indication of the determined capacity for the highest capacity utilization is visually different from the capacity icon for the lowest capacity utilization.

8. A method for providing a capacity management dashboard, the method comprising:

receiving, via a multi-network management system in communication with a plurality of network managers, at least one KPI for each RAN node of each of the plurality of network managers, wherein each of the plurality of network managers are managing a plurality of RAN nodes;

identifying, via the multi-network management system, RAN node capabilities and operating configurations for each of the plurality of RAN nodes for each of the plurality of network managers;

determining, via the multi-network management system, a capacity for each of the plurality of network managers based on the at least one KPI received and based on identifying the RAN node capabilities and the operating configurations; and displaying, via a user interface, a dashboard comprising a capacity icon for the capacity determined for each of the plurality of network managers.

9. The method according to claim 8, wherein the capacity icon for each of the plurality of network managers is displayed on the dashboard based on an identifier for each of the plurality of network managers, and wherein the capacity icon for each of the plurality of network managers is displayed on the dashboard in a descending order from a lowest capacity utilization to a highest capacity utilization.

10. The method according to claim 9, wherein the capacity icon for the highest capacity utilization is visually different from the capacity icon for the lowest capacity utilization.

11. The method according to claim 10, wherein the operations further comprise:

determining a first capacity for a first network manager of the plurality of network managers and a second capacity for a second network manager is above a threshold; and providing an alert for the first capacity and the second capacity on the dashboard based on determining the first capacity and the second capacity are above the threshold.

12. The method according to claim 9, wherein the operations further comprise:

identifying a first network manager of the plurality of network managers that corresponds to the highest capacity utilization and a second network manager of the plurality of network managers that corresponds to the lowest capacity utilization;

determining that a first capacity of the first network manager is above a threshold and that a second capacity for the second network manager is below the threshold; and providing an indication for resource reallocation from the first network manager to the second network manager.

13. The method according to claim 12, wherein the resource reallocation corresponds to a rate at which the first network manager receives the at least one KPI for each RAN node of the first network manager and a rate at which the second network manager receives the at least one KPI for each RAN node of the second network manager.

14. One or more non-transitory computer storage media having computer-executable instructions embodied thereon, that when executed by at least one processor, cause the at least one processor to perform a method comprising:

receiving, via a multi-network management system in communication with a plurality of network managers, at least one KPI for each RAN node managed by a network manager of the plurality of network managers;

storing the at least one KPI received for each of the RAN nodes managed by the network manager;

identifying, via the multi-network management system, RAN node capabilities and operating configurations for each of the plurality of RAN nodes for each of the plurality of network managers;

determining, via the multi-network management system, a capacity for the network manager based on the at least one KPI received for each RAN node managed by the network manager and based on determining the RAN node capabilities and the operating configurations; and causing to display, on a user interface, a capacity icon for the capacity determined for the network manager.

15. The one or more non-transitory computer storage media of claim 14, wherein the method further comprises:

receiving, via the multi-network management system, at least one KPI for each RAN node managed by a second network manager of the plurality of network managers;

determining, via the multi-network management system, a second capacity for the second network manager based on the at least one KPI received for each RAN node managed by the second network manager;

based on determining the second capacity, determining that the capacity of the network manager is above a first threshold and that the second capacity for the second network manager is below a second threshold, the first threshold corresponding to the RAN nodes managed by the first network manager, the second threshold corresponding to the RAN nodes managed by the second network manager; and providing an indication for resource reallocation from the network manager to the second network manager.

16. The one or more non-transitory computer storage media of claim 15, wherein the multi-network management system is in communication with over forty of the plurality of network managers.

17. The one or more non-transitory computer storage media of claim 15, wherein the method further comprises:

receiving, via the multi-network management system, at least one KPI for each RAN node managed by a third network manager of the plurality of network managers;

determining, via the multi-network management system, a third capacity for the third network manager based on the at least one KPI received for each RAN node managed by the third network manager;

determining that the third capacity of the third network manager is below a third threshold, the third threshold corresponding to the RAN nodes managed by the third network manager; and providing an indication on the dashboard for resource reallocation from the network manager to the third network manager.

18. The one or more non-transitory computer storage media of claim 17, wherein the resource reallocation corresponds to increasing a rate at which the network manager receives the at least one KPI for each RAN node of the network manager and decreasing the rate at which the second network manager and the third network manager receive the at least one KPI for each RAN node.

19. The one or more non-transitory computer storage media of claim 18, wherein the method further comprises:

determining that the second capacity is closer to the second threshold than the third capacity is to the third threshold; and causing the rate at which the third network manager receives the at least one KPI for each RAN node to decrease to a lower rate than the rate for the second network manager.

* * * * *